(12) United States Patent
Yoshida

(10) Patent No.: US 10,444,944 B2
(45) Date of Patent: Oct. 15, 2019

(54) MULTI-HIERARCHICAL MENU SELECTION DEVICE, METHOD OF OPERATING MULTI-HIERARCHICAL MENU SELECTION DEVICE, AND PROGRAM FOR OPERATING MULTI-HIERARCHICAL MENU SELECTION DEVICE

(71) Applicant: FUJIFILM Corporation, Tokyo (JP)

(72) Inventor: Masako Yoshida, Tokyo (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 31 days.

(21) Appl. No.: 15/652,823

(22) Filed: Jul. 18, 2017

(65) Prior Publication Data

US 2017/0315687 A1    Nov. 2, 2017

Related U.S. Application Data

(63) Continuation of application No. PCT/JP2015/086216, filed on Dec. 25, 2015.

(30) Foreign Application Priority Data

Jan. 21, 2015 (JP) ................................ 2015-009439

(51) Int. Cl.
*G06F 3/0482* (2013.01)
*G06F 3/0485* (2013.01)
(Continued)

(52) U.S. Cl.
CPC ........ *G06F 3/0482* (2013.01); *G06F 3/04855* (2013.01); *G06F 3/04886* (2013.01);
(Continued)

(58) Field of Classification Search
CPC ......... G06F 2203/04803; G06F 3/0482; G06F 3/04855; G06F 3/04886; G06Q 20/045; G06Q 20/0453; G07F 17/42; G07F 9/023
See application file for complete search history.

(56) References Cited

U.S. PATENT DOCUMENTS 8,631,029 B1    1/2014   Amacker
8,887,100 B1 *  11/2014  Cook ..................... G06F 3/048
                                                  715/853
(Continued)

FOREIGN PATENT DOCUMENTS

JP      2002-116857 A      4/2002

OTHER PUBLICATIONS

Written Opinion of the International Searching Authority of PCT/JP2015/086216 dated Feb. 9, 2016.
(Continued)

*Primary Examiner* — Jennifer N To
*Assistant Examiner* — Reji Kartholy
(74) *Attorney, Agent, or Firm* — Sughrue Mion, PLLC

(57) ABSTRACT

A multi-hierarchical menu selection device, a method of operating a multi-hierarchical menu selection device, and a non-transitory computer readable recording medium storing a program for operating a multi-hierarchical menu selection device capable of labor saving of an option changing operation are provided. In a case where an instruction to change an option present in a selection route directed to the common option that is being currently selected into another option in a hierarchical menu at a higher level than the common hierarchical menu is received in a state in which one common option of one submenu of a common hierarchical menu is selected, a common option that is reachable via the other option and that is the other submenus in the same common hierarchical menu as the common option selected (Continued)

immediately before the change is searched for, and the searched common options are automatically selected.

23 Claims, 25 Drawing Sheets

(51) Int. Cl.
*G07F 17/42* (2006.01)
*G06Q 20/04* (2012.01)
*G07F 9/02* (2006.01)
*G06F 3/0488* (2013.01)

(52) U.S. Cl.
CPC ........... *G06Q 20/045* (2013.01); *G07F 9/023* (2013.01); *G07F 17/42* (2013.01); *G06F 2203/04803* (2013.01); *G06Q 20/0453* (2013.01)

(56) References Cited

U.S. PATENT DOCUMENTS

| | | | | |
|---|---|---|---|---|
| 2012/0124523 A1* | 5/2012 | Zhang | ................... | G06F 3/0482 715/841 |
| 2014/0279245 A1* | 9/2014 | Callanta | ............. | G06Q 30/0623 705/26.61 |
| 2015/0026155 A1* | 1/2015 | Martin | .............. | G06F 17/30554 707/722 |

OTHER PUBLICATIONS

International Search Report of PCT/JP2015/086216 dated Feb. 9, 2016.
Communication dated Jan. 5, 2018 from the European Patent Office in counterpart European application No. 15878964.4.
"Reshaping and Pivot Tables: Reshaping by pivoting DataFrame objects", 2014, XP055436656, pp. 1- 17 (author unknown).
Communication pursuant to Article 94(3)EPC, dated Oct. 12, 2018, issued in corresponding EP Application No. 15 878 964.4, 10 pages.
Communication dated May 15, 2019 from the European Patent Office in application No. 15878964.4.
Tidewell, Jenifer, "Chapter 4: Organizing the page; Responsive Disclosure", In: Jenifer Tidwell: "Designing interfaces:[patterns for effective interaction design]" 2011, XP055453273, pp. 179-185 (10 pages).

* cited by examiner

MULTI-HIERARCHICAL MENU SELECTION DEVICE, METHOD OF OPERATING MULTI-HIERARCHICAL MENU SELECTION DEVICE, AND PROGRAM FOR OPERATING MULTI-HIERARCHICAL MENU SELECTION DEVICE

CROSS-REFERENCE TO RELATED APPLICATIONS

This application is a Continuation of PCT International Application No. PCT/JP2015/086216 filed on Dec. 25, 2015, which claims priority under 35 U.S.C. § 119(a) to Japanese Patent Application No. 2015-009439 filed on Jan. 21, 2015. Each of the above application(s) is hereby expressly incorporated by reference, in its entirety, into the present application.

BACKGROUND OF THE INVENTION

1. Field of the Invention

The present invention relates to a multi-hierarchical menu selection device, a method of operating a multi-hierarchical menu selection device, and a non-transitory computer readable recording medium storing a program for operating the multi-hierarchical menu selection device.

2. Description of the Related Art

A multi-hierarchical menu selection device in which a multi-hierarchical menu including a plurality of hierarchical menus hierarchized with a plurality of options is displayed on a selection screen and an instruction to select the option is received has become widespread. The multi-hierarchical menu has a so-called tree structure having a plurality of selection routes having branch points corresponding to the number of options of each hierarchical menu. The hierarchical menu includes, for example, at least three hierarchical menus including a first hierarchical menu having first options that are first selected, a last hierarchical menu having last options that are last selected, and an intermediate hierarchical menu arranged between the first hierarchical menu and the last hierarchical menu.

The multi-hierarchical menu is used for, for example, an operation menu for causing commands of software to be selected, or a content menu for causing content such as an image, a music file, or a template to be selected. In the case of the operation menu, the command is a last option. In the case of the content menu, the content is a last option. Further, in a hierarchical menu at a higher level, a menu name of a hierarchical menu at a lower level linked to the hierarchical menu at the higher level may be an option.

The intermediate hierarchical menu and the last hierarchical menu include a plurality of submenus present in the same hierarchy. For example, in a case where the first hierarchical menu includes two first options, the second hierarchical menu includes two submenus respectively linked to the two first options. As the number of options of the hierarchical menu at a higher level increases, the number of submenu of the hierarchical menu at a lower level linked to the option increases.

An instruction to select an option is performed, for example, by a mouse-over operation for superimposing a cursor of a mouse on the option in a state in which the option of the hierarchical menu are displayed on the selection screen. In the selection screen, the first hierarchical menu appears first, and if the first option is selected, submenus of the second hierarchical menu linked to the first selected option appear. If the second option is selected, submenus of the third hierarchical menu linked to the second selected option appear. Such a display transition is repeated to the last hierarchical menu. In the case of the operation menu, the command is a last option. Accordingly, if an instruction to select the last option is performed, a command assigned to the last option is executed.

Thus, the respective hierarchical menus appear in the selection screen in an order from a high level to a low level according to an option selection instruction in each hierarchical menu. Further, in the selection screen, a display of the respective appearing hierarchical menus is continued, and it is possible to change the options of each displayed hierarchical menu.

In such a multi-hierarchical menu, it is necessary to sequentially select the options from the first option of the first hierarchical menu in order to reach one desired last option of the last hierarchical menu. In other words, reaching one desired last option is nothing but to select one selection route via a plurality of options (a plurality of branch points). As the number of hierarchies is large, and as the number of options of the same hierarchy is large, the number of branch points increases. Accordingly, the number of selection routes for reaching the last option increases.

Generally, in a case where an option of a low-level hierarchical menu is changed, an operation of changing a selection route directed to a desired option to be changed at a branch point is performed while causing a selection route including a plurality of branch points to return to a high-level hierarchy. This option changing operation is troublesome when the number of hierarchies is large and when the number of options of the same hierarchy is large. Therefore, in JP2002-116857A, a selection route for reaching a last option selected in a most recent operation is stored, and the stored selection route is automatically selected in a case where an option changing operation is performed. Accordingly, an effort of an operation of changing an option is omitted.

In JP2002-116857A, an editing operation menu of a word processor is illustrated as a multi-hierarchical menu. As illustrated in FIGS. 13 and 15 of JP2002-116857A, the editing operation menu includes three hierarchical menus including first, second, and third hierarchical menus. The first hierarchical menu includes first options such as "Tool" or "Form". The second hierarchical menu, which is an intermediate hierarchical menu, includes a tool submenu having a second option such as "Correction (redlining)" linked to the first option "Tool", a form submenu having a second option such as "character size" linked to the first option "Form", and the like. The third hierarchical menu, which is a last hierarchical menu, includes a correction (redlining) submenu having a third option (last option) such as "Correction (redlining) start" linked to the second option "Correction (redlining)", a character size submenu having a third option such as "Vertically double" linked to the second option "Character size", and the like.

FIG. 13 of JP2002-116857A illustrates a state in which a mouse is laid over a third option "Correction (redlining) start" along a selection route of a first option "Tool" and a second option "Correction (redlining)". In this state, a case where a third option "Vertically double" is changed along a selection route of first and second other options, for example, a selection route of the first option "Form" and the second option "Character size" is conceivable.

A selection route for reaching the third option "Correction (redlining) start" and a selection route for reaching the third option "Vertically double" are different from each other in that the first option of the former is "Tool" and the first option of the latter is "Form". Both of the routes are branched in the first hierarchical menu. Therefore, in the option changing operation of the related art, in a case where a change into the third option "Vertically double" occurs in a state in which the mouse is laid over to the third option "Correction (redlining) start", a selection route for reaching the current third option "Correction (redlining) start" is caused to temporarily return the first hierarchical menu in which there is a branch point, the first option is changed from "Tool" to "Form", the second option "Character size" is selected, and then, a selection route for reaching the third option "Vertically double" is utilized, which is complicated.

In JP2002-116857A, in a case where the third option "Vertically double" is selected in a most recent operation and a selection route for reaching the third option "Vertically double" is stored, the selection route for reaching the third option "Vertically double" is called and the mouse is automatically laid over the third option "vertically double" in a step in which return to the first option "Form" of the first hierarchical menu is performed in order to change the option into the third option "Vertically double" in a state in which the mouse is laid over the third option "Correction (redlining) start" (see FIG. 15 in JP2002-116857A). Accordingly, an effort of an operation of changing an option is reduced.

SUMMARY OF THE INVENTION

The technology described in JP2002-116857A is a technology for storing a selection route for reaching a last option selected in the most recent operation and automatically selecting the stored selection route in a case where an option changing operation is performed, and is effective in a case where an option to be changed is a last option selected in the most recent operation. However, the technology described in JP2002-116857A may not work necessarily effectively according to content or a type of option.

In addition to the editing operation menu described in JP2002-116857A, the multi-hierarchical menu may be used, for example, in a case where a product is selected as a last option at a shopping site on the Internet or in a case where a pattern of the postcard is selected as a last option in a print order reception device that receives a print order of a postcard. In this use, a user finds a pattern of a favorite product or postcard while viewing or comparing patterns of a variety of products or postcards. In this case, the technology described in JP2002-116857A does not function effectively, the option is arbitrarily changed into an option not intended by a user and, rather, operability may be deteriorated.

In a multi-hierarchical menu used in a shopping site or a print order reception device, options of a relatively higher-level hierarchical menu have different attribute like the editing operation menu described in JP2002-116857A. However, a relatively lower-level hierarchical menu close to a last hierarchical menu often has options having common attributes among different submenus of the same hierarchy. Hereinafter, an option having a common attribute is referred to as a common option, and a hierarchical menu with the common option is referred to as a common hierarchical menu.

In a case where there is such a common hierarchical menu and where the technology described in JP2002-116857A is applied, an effect of a reduction of the effort of the option changing operation due to the automatic option selection may be reduced. In a case where there is a common hierarchical menu, the user's preference is strongly reflected in selection of the option. Accordingly, in a multi-hierarchical menu including a common hierarchical menu, a technology for achieving labor saving of the option changing operation while reflecting the user's preference has been required.

An object of the present invention is to provide a multi-hierarchical menu selection device, a method of operating a multi-hierarchical menu selection device, and a non-transitory computer readable recording medium storing a program for operating a multi-hierarchical menu selection device capable of labor saving of an option changing operation in a case where there is a common hierarchical menu.

In order to solve the above-mentioned problem, a multi-hierarchical menu selection device of the present invention comprises a screen output control unit that controls output of a selection screen in which a multi-hierarchical menu including at least three hierarchical menus including a first hierarchical menu having first options that are first selected, a last hierarchical menu having last options that are last selected, and a common hierarchical menu arranged between the first hierarchical menu and the last hierarchical menu and having a plurality of submenus including common options having a common attribute is displayed, the respective hierarchical menus appear in an order from a high-level hierarchy according to an instruction to select each option, and each option selected in each hierarchical menu is changeable until selection of the last option is determined; an instruction reception unit that receives the instruction to select each option on the selection screen; and an automatic selection unit that automatically selects the option on the basis of option relationship information indicating a relationship among the respective options, the option relationship information including common option information indicating which of the respective options is a common option, and selection route information indicating a selection route of each option according to the selection instruction. In a case where the instruction reception unit receives an instruction to change the option present in the selection route directed to the common option that is being currently selected into another option in a hierarchical menu at a higher level than the common hierarchical menu in a state in which one common option of one submenu of the common hierarchical menu is selected, the automatic selection unit searches for the common options that is reachable via the other option and that is the other submenus in the same common hierarchical menu as the common option selected immediately before the change, and automatically selects the searched common options.

It is preferable for a sub display region that shows the selection route by displaying selected menus that are the hierarchical menus of which selection of options is completed in a hierarchical order from a high level, and a main display region in which an unselected menu which is a hierarchical menu at a lower level than the selected menu and of which selection of an option is not completed is displayed to be provided in the selection screen.

It is preferable for the screen output control unit to switch a display of the selection route of the sub display region according to automatic selection of the common option in the automatic selection unit.

It is preferable that all the options of the selected menu that is a combination of an option that is being selected and an unselected option are displayed in the sub display region, and the unselected option is displayed to be changeable from the option that is being selected.

Further, it is preferable for a display area of the main display region to be larger than that of the sub display region. In this case, it is preferable for the respective options to be arranged in the main display region at wider intervals that those for respective options of the selected menus in the sub display region.

It is preferable that the screen output control unit causes detailed information on the option to be displayed in the main display region, and causes the detailed information not to be displayed in the sub display region. Further, it is preferable for the multi-hierarchical menu selection device to be capable of causing one selected menu in the sub display region in place of the unselected menu to be displayed in the main display region.

It is preferable that the number of selected menus that is displayable in the sub display region is set in advance, and the screen output control unit hides the selected menus in an order from the selected menus of the hierarchy at a higher level in a case where the number of selected menus exceeds the set number. In this case, it is preferable for the hidden selected menu to be re-displayable.

It is preferable that the multi-hierarchical menu includes a product or a service prepared as the last option and is used to receive an order of the product or the service or to search for the product or the service. In this case, it is preferable for the option to be a classification item for classifying the product or the service.

A method of operating a multi-hierarchical menu selection device of the present invention comprises a screen output control step of controlling output of a selection screen in which a multi-hierarchical menu including at least three hierarchical menus including a first hierarchical menu having first options that are first selected, a last hierarchical menu having last options that are last selected, and a common hierarchical menu arranged between the first hierarchical menu and the last hierarchical menu and having a plurality of submenus including common options having a common attribute is displayed, the respective hierarchical menus appear in an order from a high-level hierarchy according to an instruction to select each option, and each option selected in each hierarchical menu is changeable until selection of the last option is determined; an instruction reception step of receiving the instruction to select each option on the selection screen; and an automatic selection step of automatically selecting the option on the basis of option relationship information indicating a relationship among the respective options, the option relationship information including common option information indicating which of the respective options is a common option, and selection route information indicating a selection route of each option according to the selection instruction. In a case where an instruction to change the option present in the selection route directed to the common option that is being currently selected into another option in a hierarchical menu at a higher level than the common hierarchical menu is received in the instruction reception step in a state in which one common option of one submenu of the common hierarchical menu is selected, the automatic selection step includes searching for the common options that is reachable via the other option and that is the other submenus in the same common hierarchical menu as the common option selected immediately before the change, and automatically selecting the searched common options.

A non-transitory computer readable recording medium storing a program for operating a multi-hierarchical menu selection device of the present invention causes a computer to execute a screen output control function of controlling output of a selection screen in which a multi-hierarchical menu including at least three hierarchical menus including a first hierarchical menu having first options that are first selected, a last hierarchical menu having last options that are last selected, and a common hierarchical menu arranged between the first hierarchical menu and the last hierarchical menu and having a plurality of submenus including common options having a common attribute is displayed, the respective hierarchical menus appear in an order from a high-level hierarchy according to an instruction to select each option, and each option selected in each hierarchical menu is changeable until selection of the last option is determined; an instruction reception function of receiving the instruction to select each option on the selection screen; and an automatic selection function of automatically selecting the option on the basis of option relationship information indicating a relationship among the respective options, the option relationship information including common option information indicating which of the respective options is a common option, and selection route information indicating a selection route of each option according to the selection instruction. In a case where an instruction to change the option present in the selection route directed to the common option that is being currently selected into another option in a hierarchical menu at a higher level than the common hierarchical menu is received in the instruction reception function in a state in which one common option of one submenu of the common hierarchical menu is selected, the automatic selection function includes searching for the common options that is reachable via the other option and that is the other submenus in the same common hierarchical menu as the common option selected immediately before the change, and automatically selecting the searched common options.

According to the present invention, in a case where there is a common hierarchical menu having a plurality of submenus including common options having common attributes, and in a case where an instruction to change the option present in the selection route directed to the common option that is being currently selected into another option in a hierarchical menu at a higher level than the common hierarchical menu is received in a state in which one common option of one submenu of the common hierarchical menu is selected, the common options that is reachable via the other option and that is the other submenus in the same common hierarchical menu as the common option selected immediately before the change is searched for, and the searched common options are automatically selected. Accordingly, it is possible to provide a multi-hierarchical menu selection device, a method of operating a multi-hierarchical menu selection device, and a non-transitory computer readable recording medium storing a program for operating a multi-hierarchical menu selection device capable of labor saving of an option changing operation in a case where there is a common hierarchical menu.

DESCRIPTION OF THE PREFERRED EMBODIMENTS

First Embodiment

Figure 1:
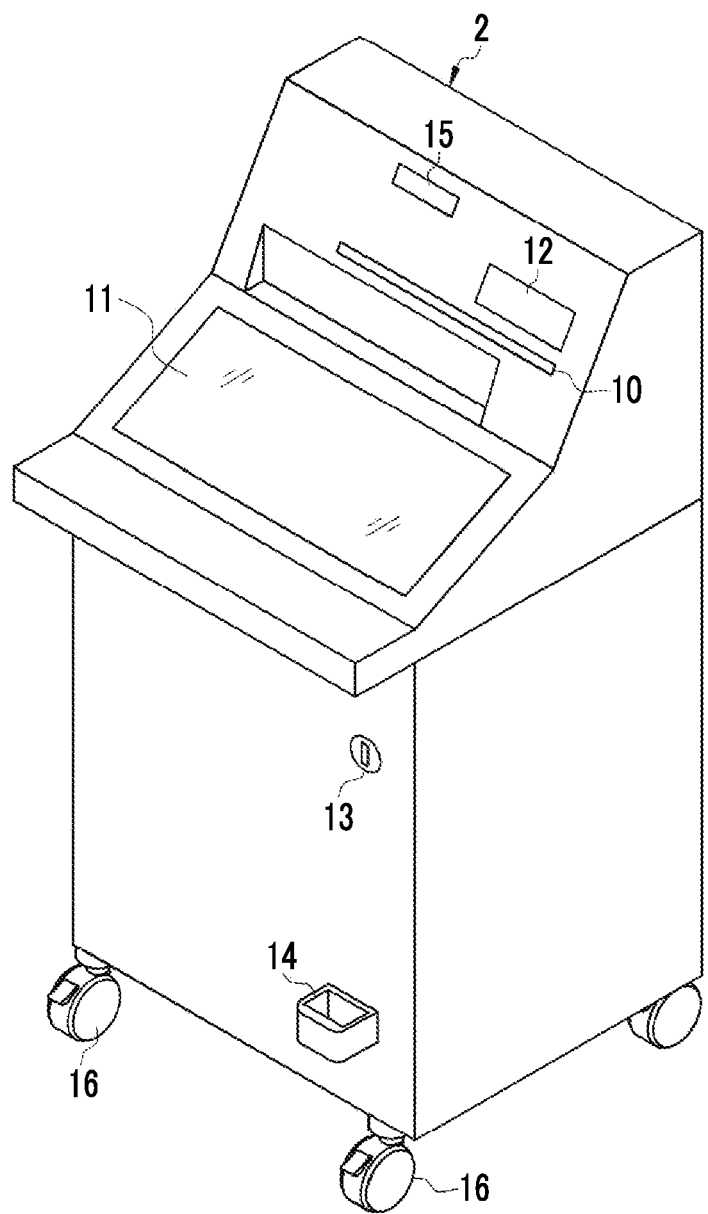
FIG. 1 is a perspective view illustrating an appearance of a print order reception device.

In FIG. 1, a print order reception device 2 corresponding to a multi-hierarchical menu selection device of the present invention is installed at a shop front of a supermarket, a convenience store, or the like, and receives a print order of a postcard (corresponding to a product or a service) from a user. A printer 20 (see FIG. 2) for printing the postcard according to the print order is built into the print order reception device 2. A user brings various removable media such as a memory card having data of a photo to be pasted to a postcard recorded thereon to the print order reception device 2, makes a print order of the postcard, receives the postcard printed according to the print order, and pays price.

A medium slot group 10 into which various removable media are inserted, a liquid crystal display (hereinafter referred to as a touch panel display) 11 having a touch panel stacked on its surface, a postcard discharge port 12 from which a printed postcard is discharged, a coin slot 13 into which coins are inserted, a return port 14 from which a change returns, and a receipt discharge port 15 from which a receipt that is printed by a receipt printer 21 (see FIG. 2) and in which order content of the postcard, an inserted amount, a change, or the like is described is discharged are provided on the front of the print order reception device 2 facing the user. Further, casters 16 are attached to a lower portion of the print order reception device 2 in order to simplify installation at a shop front.

Figure 2:
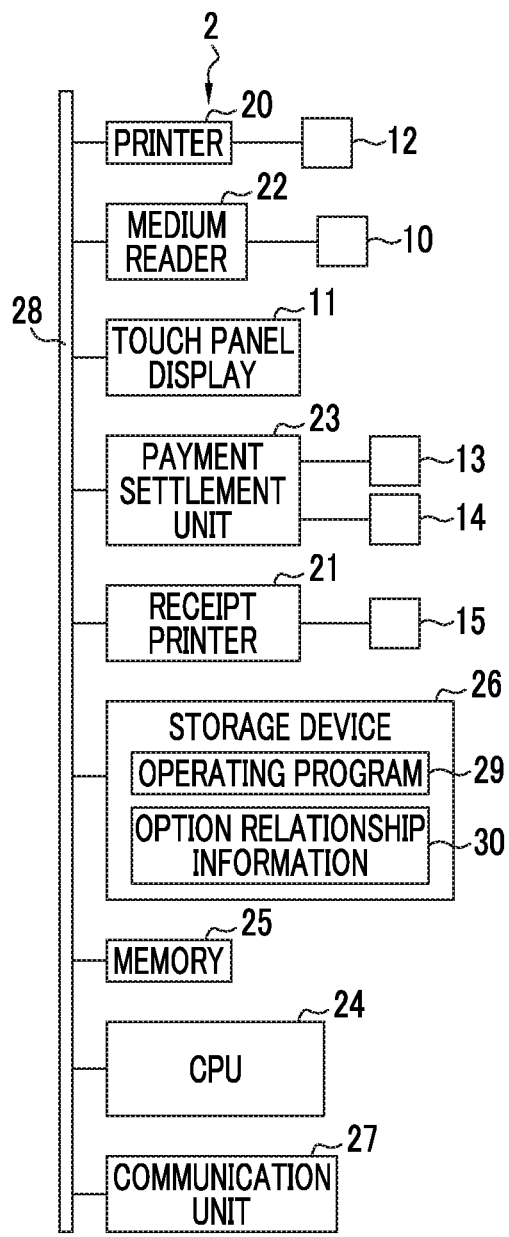
FIG. 2 is a block diagram illustrating a configuration of the print order reception device.

In FIG. 2, the print order reception device 2 includes a medium reader 22, a payment settlement unit 23, a central processing unit (CPU) 24, a memory 25, a storage device 26, and a communication unit 27, in addition to the touch panel display 11, the printer 20, and the receipt printer 21 described above. These are interconnected via a data bus 28.

The medium reader 22 reads photograph data from a removable medium inserted into the medium slot group 10 under the control of the CPU 24. The medium reader 22 stores the read photograph data in the memory 25. The medium reader 22 may be configured to connect to a digital camera of a user in a wired or wireless manner and directly read the photograph data from the digital camera, instead of or in addition to the configuration for acquiring the photograph data via the removable medium.

The payment settlement unit 23 calculates a payment on the basis of order content of a postcard input via the touch panel display 11 under control of the CPU 24. The payment settlement unit 23 monitors the input amount of coins to the coin slot 13. The payment settlement unit 23 calculates a difference between the calculated payment and the input amount of money, that is, a change amount, and outputs coins corresponding to the calculated change amount to the return port 14. The payment settlement unit 23 transmits information on the payment, the inserted amount, and the change amount to the receipt printer 21.

The storage device 26 is a hard disk drive incorporated in the print order reception device 2. A control program such as an operating system, various application programs including an operating program 29, display data of various operation screens associated with these programs, option relationship information 30, and the like are stored in the storage device 26. The operating program 29 is a program for causing the print order reception device 2 to function as a multi-hierarchical menu selection device.

The memory 25 is a work memory with which the CPU 24 executes a process. The CPU 24 loads the program stored in the storage device 26 into the memory 25 and executes a process according to the program to thereby control each unit of the computer.

The communication unit 27 is a network interface that performs transfer of various types of information between the print order reception device 2 and an external device over a network such as the Internet. The external device is, for example, another print order reception device 2 installed in the same store or another store, or a management server that is operated by a manufacturer of the print order reception device 2. Information indicating each other's operating states, for example, is transmitted or received to or from the other print order reception device 2. In the case of the management server, information indicating an operation state is transmitted to the management server, and update information of the operating program 29 distributed from the management server is received.

The touch panel display 11 displays various operation screens according to an operation of the user. An operation function using a Graphical User Interface (GUI) is included in the operation screen. The print order reception device 2 receives an input of an operation instruction using a finger F (see FIG. 6) of the user through the GUI.

A selection screen 62 for multi-hierarchical menu (see FIG. 5 or the like) in which a plurality of hierarchical menus having a plurality of options appear is displayed as an operation screen on the touch panel display 11. The user selects a desired option of each hierarchical menu in this selection screen 62, and lastly determines the pattern of the desired postcard.

Figure 3:
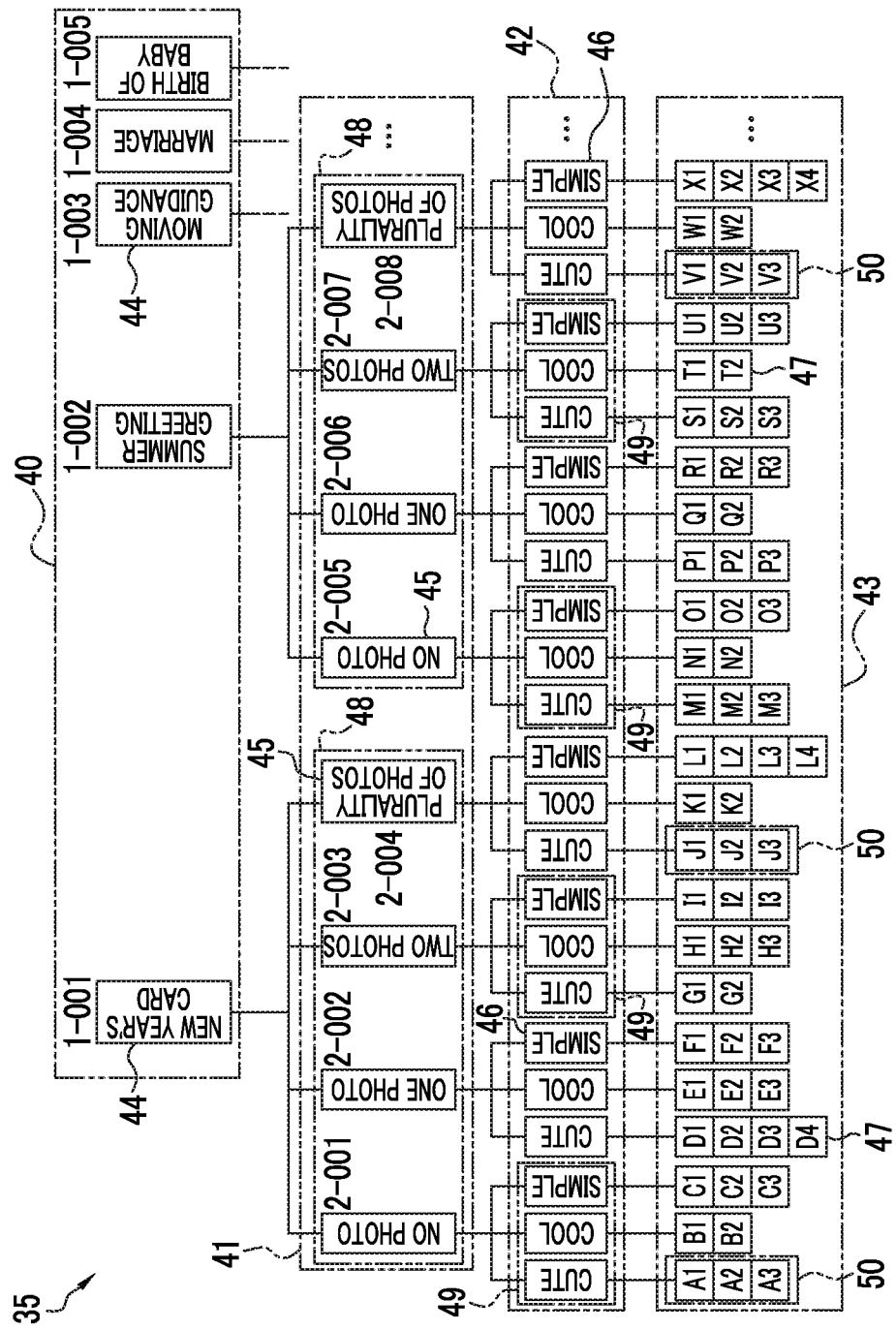
FIG. 3 is a diagram illustrating a multi-hierarchical menu.

In FIG. 3, a multi-hierarchical menu 35 including four hierarchical menus including a first hierarchical menu 40, a second hierarchical menu 41, a third hierarchical menu 42, and a fourth hierarchical menu 43 is prepared in the print order reception device 2. A first option 44 indicating use of a postcard of "New Year's card", "Summer greeting", "Moving guidance", "Marriage", and "Birth of baby" is prepared in the first hierarchical menu 40, a second option 45 indicating the number of photos to be pasted on the postcard of "No photo", "One photo", "Two photos", and "A plurality of photos (collage)" is prepared in the second hierarchical menu 41, a third option 46 indicating taste of a pattern of the postcard of "Cute", "Cool", and "Simple" is prepared in a third hierarchical menu 42, and the pattern itself of the postcard is prepared as the fourth option 47 in the fourth hierarchical menu 43.

The use of the first option 44, the number of photos of the second option 45, and the taste of the third option 46 are classification items for classifying patterns of a postcard that is a product. For convenience of description, the patterns of the postcard of the fourth option 47 are distinguished with reference signs such as "A1", "B1", and "G1". Further, the second to fourth options 45 to 47 linked to "Moving guidance", "Marriage", and "Birth of baby" of the first options 44 are not illustrated.

The fourth option 47 is a last option to be last selected, and the fourth hierarchical menu 43 is a last hierarchical menu. Further, "No photo", "One photo", "Two photos", and "A plurality of photos (collage)" of the second option 45 are common options having common attributes (the number of photos) regardless of the options of the hierarchy at a higher level, and the second hierarchical menu 41 is a common hierarchical menu. Further, "Cute", "Cool", and "Simple" of the third options 46 are also common options having common attributes (the taste of the patterns), and the third hierarchical menu 42 is also a common hierarchical menu. That is, the same second options 45 are linked to any of the first options 44, and the same third options 46 are linked to any of the second options 45.

Here, the common option refers to an option having a common attribute, which is present in each of the plurality of submenu (which will be described below) in the same hierarchical menu. Further, the common hierarchical menu refers to a hierarchical menu having a plurality of submenus including the common option.

The second hierarchical menu 41 includes five submenus (hereinafter referred to as the number-of-sheet submenus) 48 respectively linked to the five first options 44. In FIG. 3, only two number-of-sheet submenus 48 linked to the two first options 44 of "New Year's card" and "Summer greeting" are illustrated due to space constraints. Further, the third hierarchical menu 42 includes 20 submenus (hereinafter referred to as taste submenus) 49 linked to 20 (=5×4) second options 45. Since the second option 45 and the third option 46 are respective common options, all of the respective number-of-sheet submenus 48 and the respective taste submenus 49 have the same content. The fourth hierarchical menu 43 includes 60 (=20×3) submenus (hereinafter referred to as pattern submenus) 50, similar to the second hierarchical menu 41 and the third hierarchical menu 42. The respective submenus 48 to 50 are illustrated with some of them are surrounded by two-dot chain lines for avoidance of complexity.

Thus, the second to fourth hierarchical menus 41 to 43 include a plurality of submenus 48 to 50 present in the same hierarchy. Further, the respective hierarchical menus 40 to 43 have a so-called tree structure including a plurality of selection routes having branch points corresponding to the number of respective options 44 to 47.

Option IDs (Identification data) for identifying the respective options are assigned to the respective options 44 to 47. The option ID is a combination of two numbers and a hyphen such as "1-001" and "2-001", as illustrated at the top or next to the first options 44 and the second options 45 (option IDs of the third options 46 and the fourth options 47 are not illustrated in view of a space). The number before the hyphen indicates a hierarchy to which the option belongs, and the number after the hyphen indicates an order in the hierarchy to which the option belongs. For example, since "Birth of baby" is the fifth option (counted from the left of FIG. 3) in the first hierarchical menu 40, the option ID is "1-005". Since "A plurality of photos (collage)" linked to the "Summer greeting" is the eighth option of the second hierarchical menu 41, the option ID is "2-008".

Figure 4:
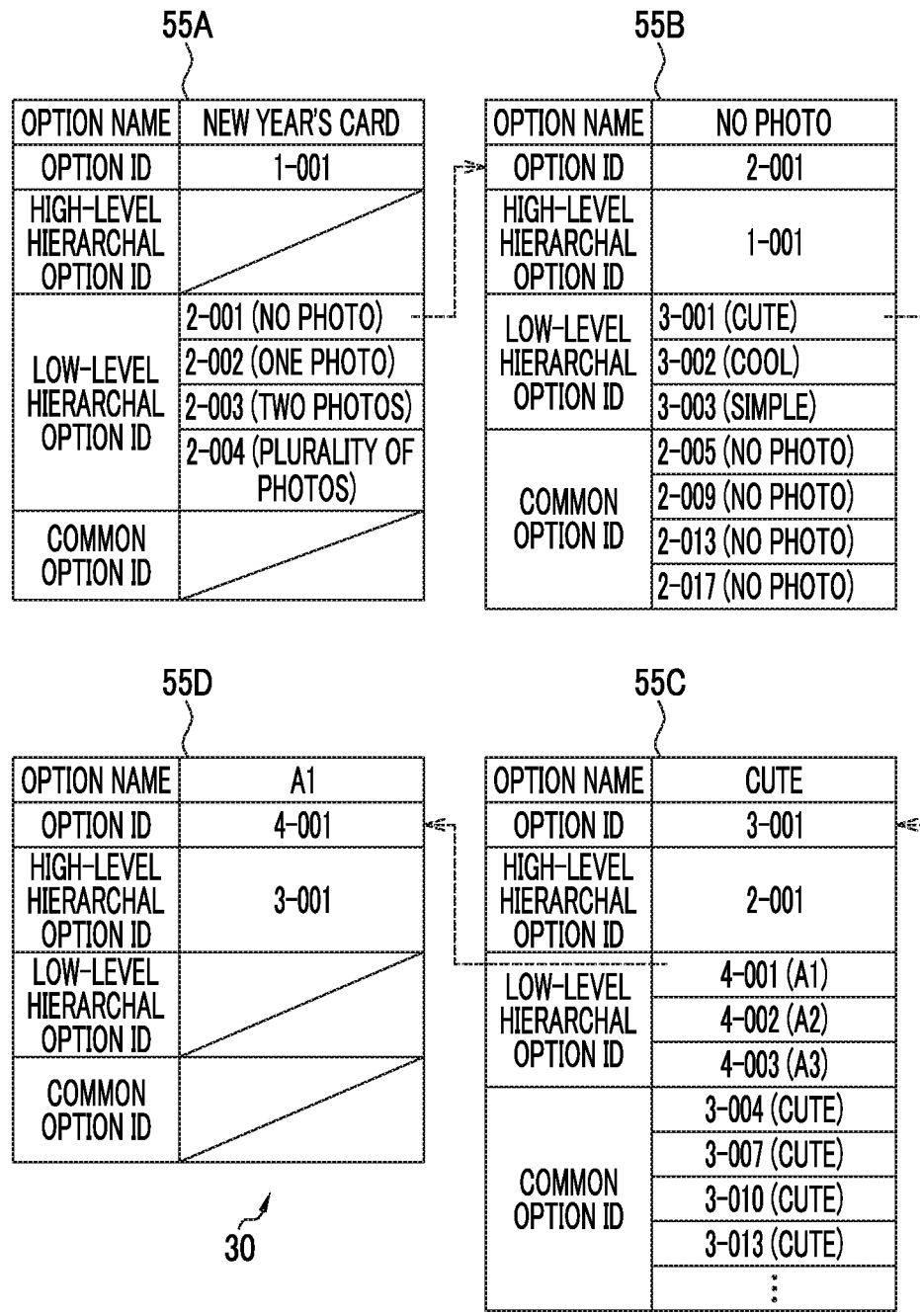
FIG. 4 is a diagram illustrating option relationship information.

In FIG. 4, the option relationship information 30 stored in the storage device 26 includes a plurality of information blocks 55 prepared for respective options. In FIG. 4, information blocks 55A, 55B, 55C, and 55D with four options ("New Year's card", "No photo", "Cute", and "A1") of first to fourth hierarchies linked to one another are illustrated.

The information block 55 includes respective items of an option name, an option ID, an high-level hierarchal option ID, a low-level hierarchal option ID, and a common option ID. A name of an option such as "New Year's card" and "No photo" is literally registered in the item of the option name, and an option ID of the option such as "1-001" and "2-001" are registered in the item of the option ID.

Option IDs of options of the high-level hierarchy linked to the above option are registered in the item of the high-level hierarchal option ID. For example, an option ID "1-001" of "New Year's card" that is an option of the high-level hierarchy linked to the above option, that is, the first option 44 is registered in an item of the high-level hierarchal option ID of the information block 55B of the option name "No photo" with the option ID "2-001", which is the second option 45. Further, the option of the high-level hierarchy linked to the option, that is, the option ID "2-001" of "No photo" that is the second option 45 is registered in an item of the high-level hierarchal option ID of the information block 55C of the option name "Cute" with the option ID "3-001", which is the third option 46.

Meanwhile, since there is no option of the high-level hierarchy to be linked in an item of the high-level hierarchal option ID of the information block 55A of the option name "New Year's card" and the option ID "1-001" that are the first options 44, nothing is registered.

Option IDs of options of the low-level hierarchy linked to the above option are registered in an item of the low-level hierarchal option ID. For example, option IDs "2-001" to "2-004" of "No photo", "One photo", "Two photos", and "A plurality of photos (collage)" that are options of the low-level hierarchy linked to the option "New Year's card", that is, the second option 45 are registered in the item of the low-level hierarchal option ID of the information block 55A. Further, option IDs "3-001" to "3-003" of "Cute", "Cool", and "Simple" that are options of the low-level hierarchy linked to the option "No photo", that is, the third option 46 are registered in an item of the low-level hierarchal option ID of the information block 55B.

On the other hand, nothing is registered in an item of the low-level hierarchal option ID of the information block 55D of the option name "A1" and the option ID "4-001" that are the fourth option 47 since there is no option to be linked. What option is linked to what kind of option, that is, a dependency relationship of the respective options 44 to 47 can be recognized from the items of the high-level hierarchy option ID and the low-level hierarchal option ID.

An option ID of an option having a common option relationship with the above option in the same hierarchy is registered in an item of the common option ID. That is, an item of the common option ID corresponds to common selection information indicating which of the options 44 to 47 is a common option. For example, option IDs "2-009", "2-013", and "2-017" of "No photo" of the second option 45 respectively linked to "Moving guidance", "Marriage", and "Birth of baby" that are the first options 44, starting with the option ID "2-005" of "No photo" of the second option 45 linked to "Summer greeting" that is the first option 44, are registered in an item of the common option ID of the information block 55B. The options with the option IDs are the second option 45 of "No photo" of the number-of-sheet submenu 49 linked to "Summer greeting", "Moving guidance", "Marriage", and "Birth of baby" that are the first option 44, and are common options of the option with the option name "No photo" of the information blocks 55B.

Similarly, the option ID "3-007" of "Cute" of the third option 46 linked to "Two photo" that is the second option 45 and the option ID "2-003", the option ID "3-010" of "Cute" of the third option 46 linked to "A plurality of photos (collage)" that is the second option 45 and the option ID "2-004", and the option ID "3-013" of "Cute" of the third option 46 linked to "No photo" that is the second option 45 and the option ID "2-005", and the like, starting with the option ID "3-004" of "Cute" of the third option 46 linked to "One photo" that is the second option 45 and the option ID "2-002", are registered in an item of the common option ID of the information block 55C.

Meanwhile, since the first options 44 show the uses of the postcard of "New Year's card", "Summer greeting", "Moving guidance", "Marriage", and "Birth of baby", the fourth options 47 are the patterns of the postcard, and the fourth options 47 of the respective pattern submenus 50 are different from one another. Therefore, since the first options 44 and the fourth options 47 are not common options, nothing is registered in an item of the common option ID of the information block 55A and the information block 55D. The common option of the option can be recognized from the item of the common option ID.

Figure 5:
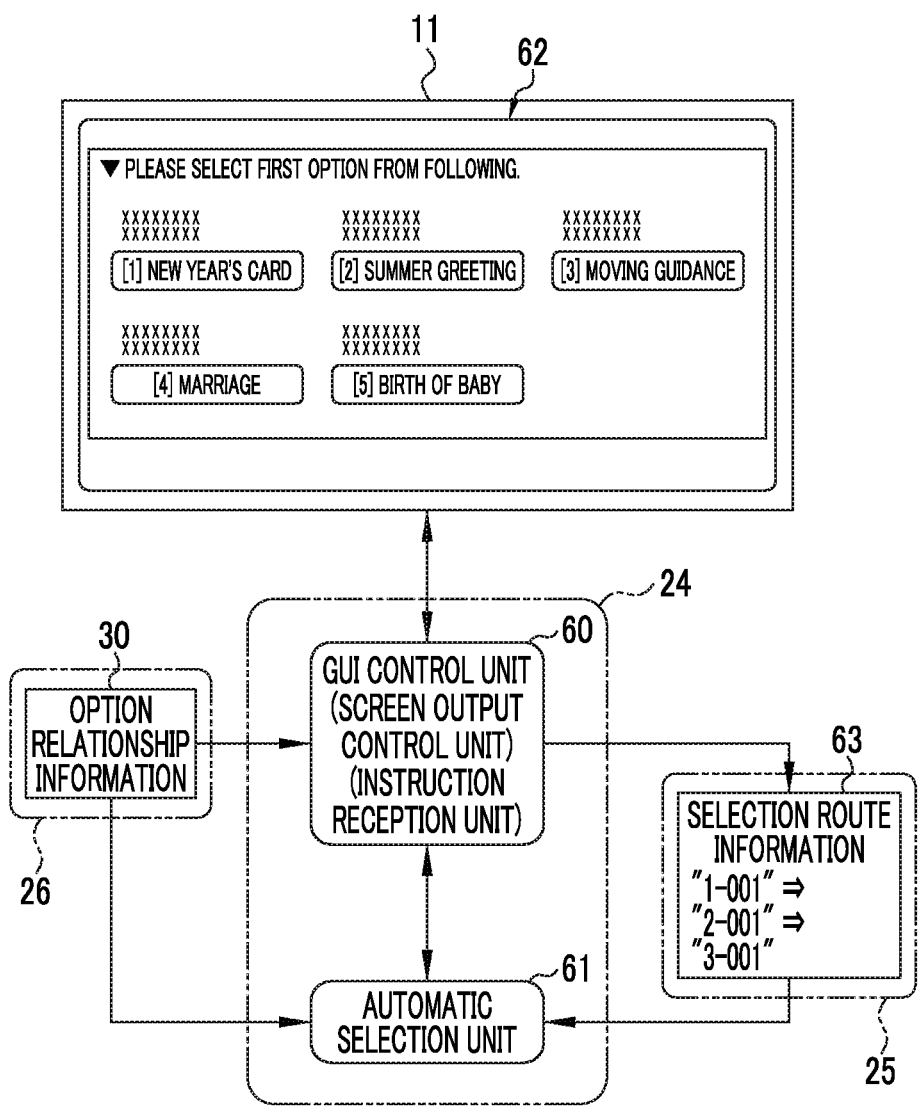
FIG. 5 is a diagram illustrating functional units of a CPU of the print order reception device.

In FIG. 5, the CPU 24 of the print order reception device 2 functions as a GUI control unit 60 and an automatic selection unit 61 in cooperation with the memory 25 when the operating program 29 starts up.

The GUI control unit 60 corresponds to a screen output control unit and an instruction reception unit. The GUI control unit 60 has a screen output control function of controlling output of the touch panel display 11 of the selection screen 62 based on the option relationship information 30, and an instruction reception function of receiving a selection instruction of respective options 44 to 47 on the selection screen 62 by the finger F of the user.

Further, the GUI control unit 60 records selection route information 63 indicating a selection route of the respective options 44 to 47 according to the received selection instruction in the memory 25. In the selection route information 63, specifically, option IDs of respective options that the user selects on the selection screen 62 are recorded in a selection order. For example, in a case where "New Year's card" is selected as the first option 44, "No photo" is selected as the second option 45, and "Cute" is selected as the third option 46 in order, the GUI control unit 60 records "1-001 (New Year's card)" "2-001 (no photo)" "3-001 (cute)" as the selection route information 63, as illustrated in FIG. 5.

The automatic selection unit 61 has an automatic selection function of automatically selecting the option on the basis of the option relationship information 30 and the selection route information 63.

Figure 6:
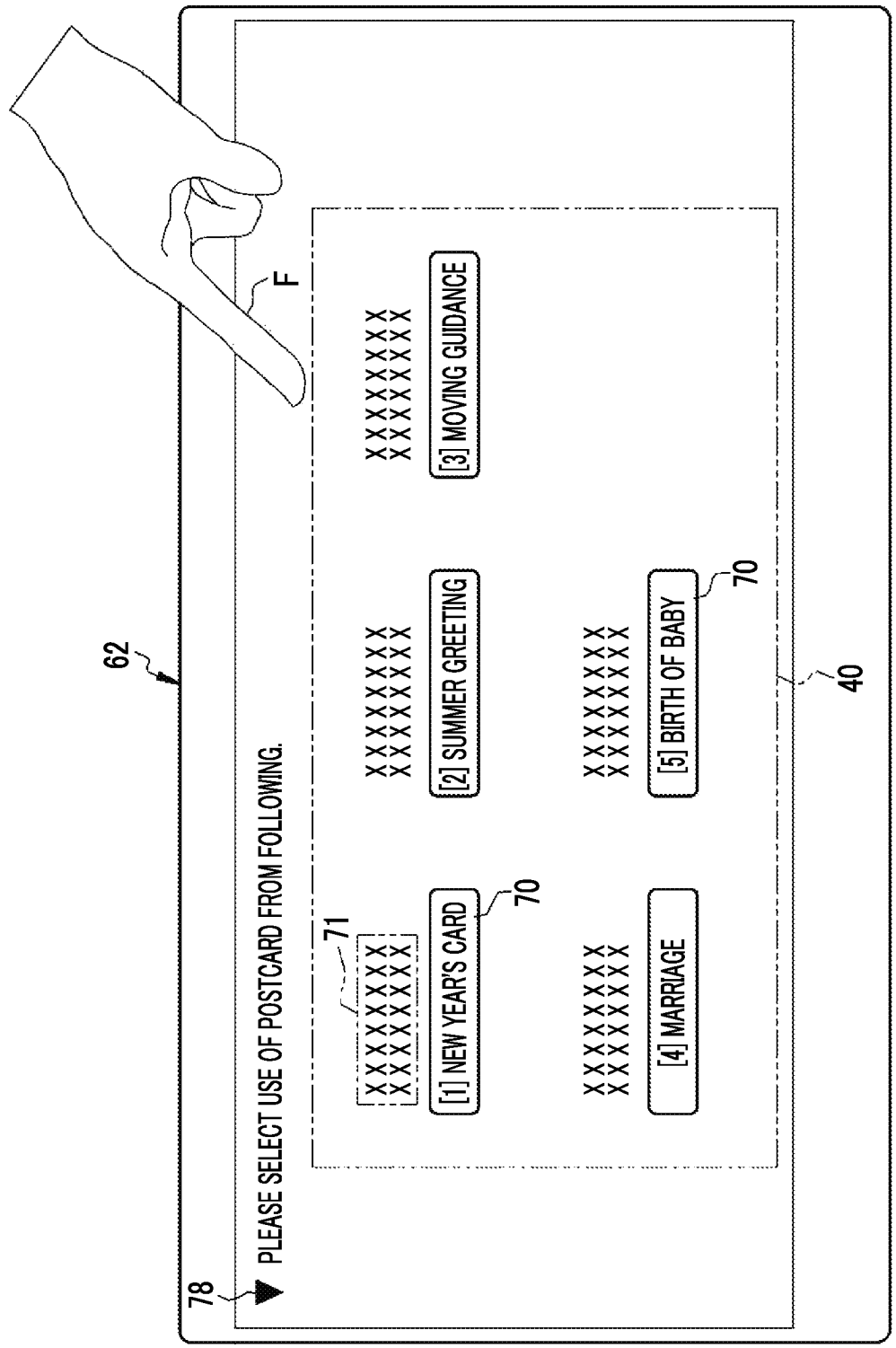
FIG. 6 is a diagram illustrating a selection screen in which a first hierarchical menu is displayed.

The GUI control unit 60 outputs the selection screen 62 illustrated in FIG. 6 or the like to the touch panel display 11. A message "Please select use of the postcard from following." and the first hierarchical menu 40 are displayed on the selection screen 62 of FIG. 6. More specifically, the respective first options 44 of "New Year's card", "Summer greeting", "Moving guidance", "Marriage", and "Birth of baby" in the first hierarchical menu 40 are displayed in the form of selection buttons 70 for selecting the first options.

The respective selection buttons 70 are aligned in an order of numbers after hyphens of the option IDs and are displayed at wide intervals in an entire area of the selection screen 62. Numbers assigned in an order of the numbers after the hyphens of option IDs and the option names are displayed on the selection button 70.

Further, detailed information 71 regarding each of the first options 44 surrounded by a two-dot chain line is displayed over the selection button 70. The detailed information 71 is an appeal sentence "A New Year's greeting can be simply created with a professional scheme of making rich designs and photos beautiful" or a sentence "A New Year's card is created by pasting a favorite photo" in the case of, for example, "New Year's card".

Figure 7:
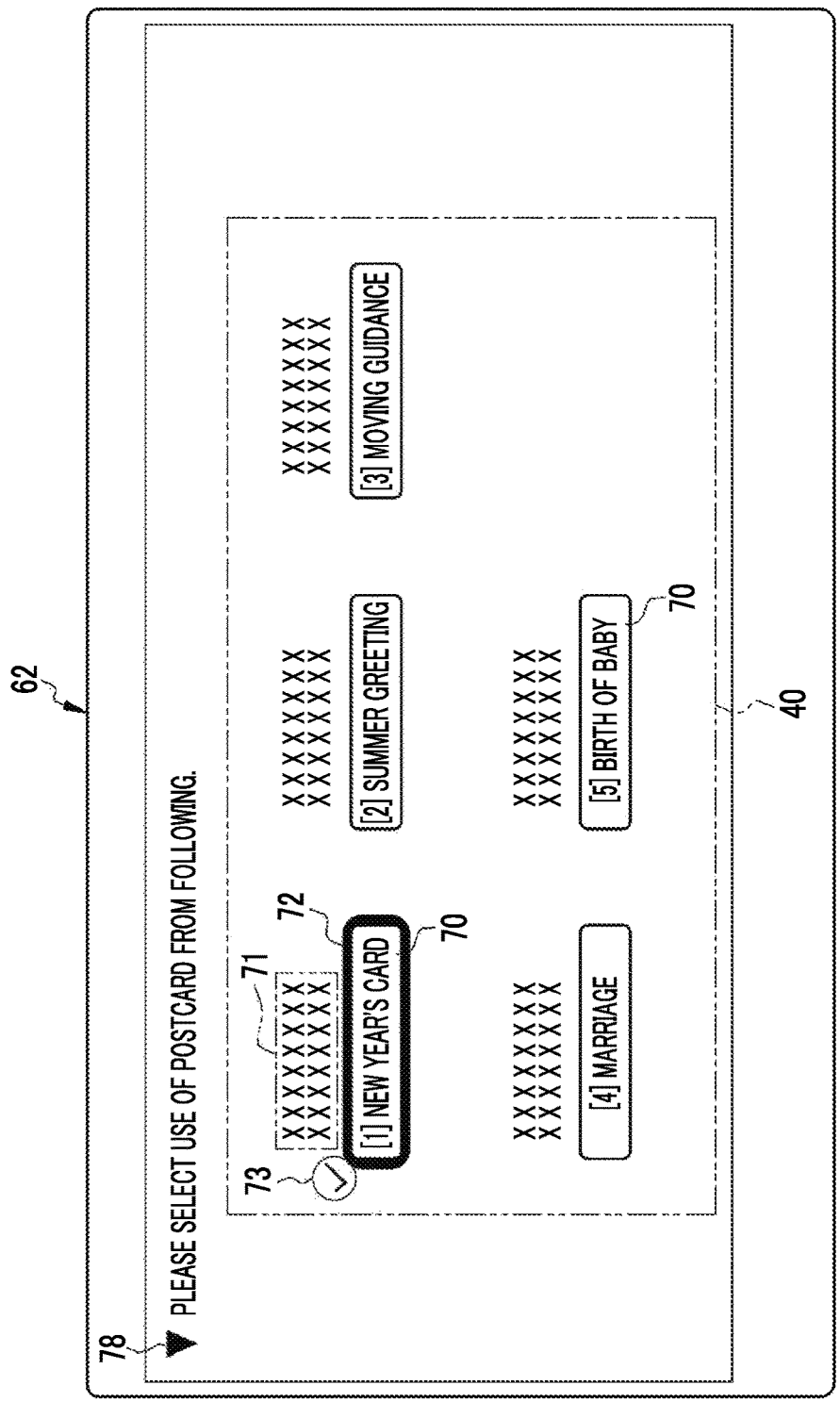
FIG. 7 is a diagram illustrating a selection screen immediately after a first option is selected.
Figure 8:
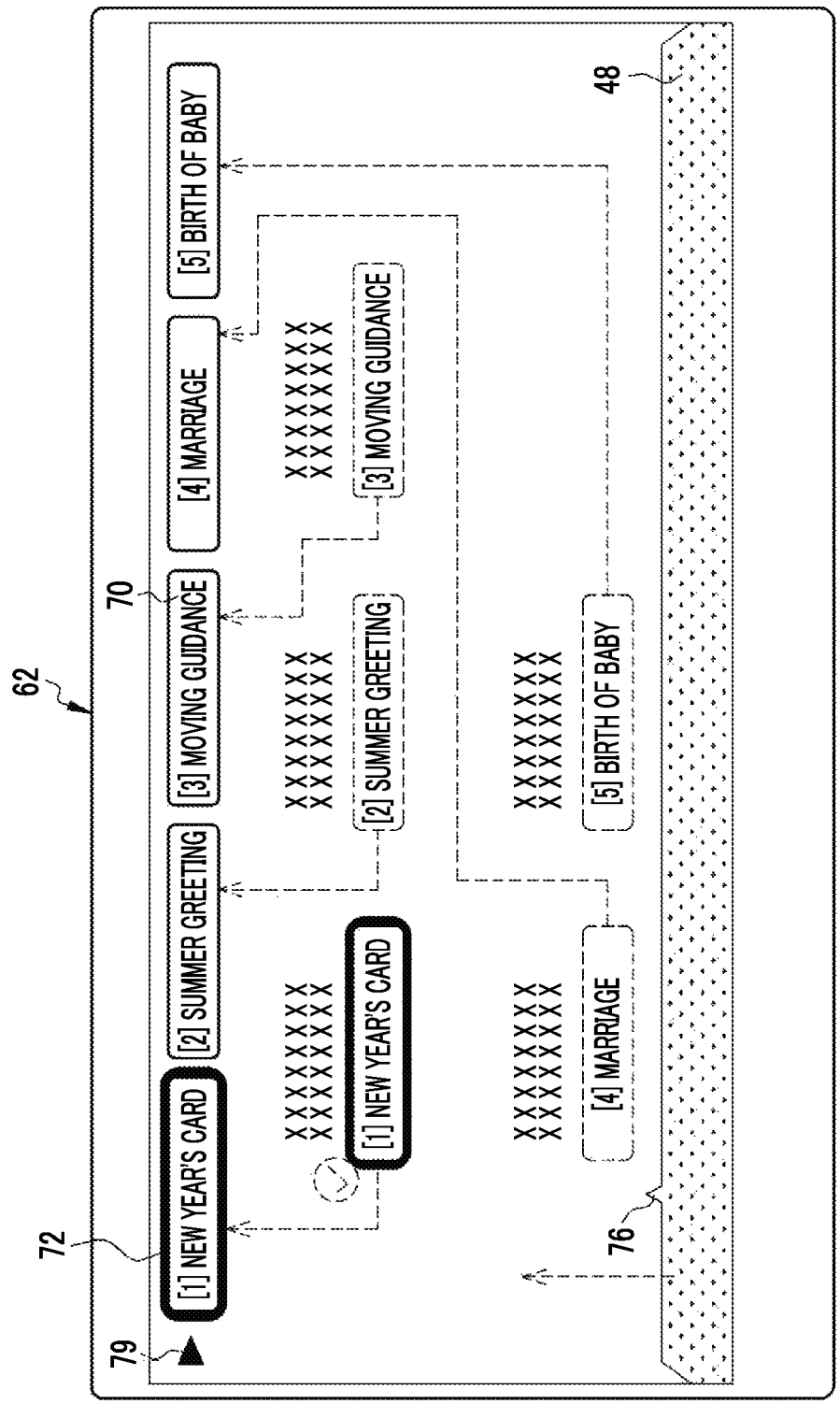
FIG. 8 is a diagram illustrating a transition of a display state of the selection screen after the first option is selected.
Figure 9:
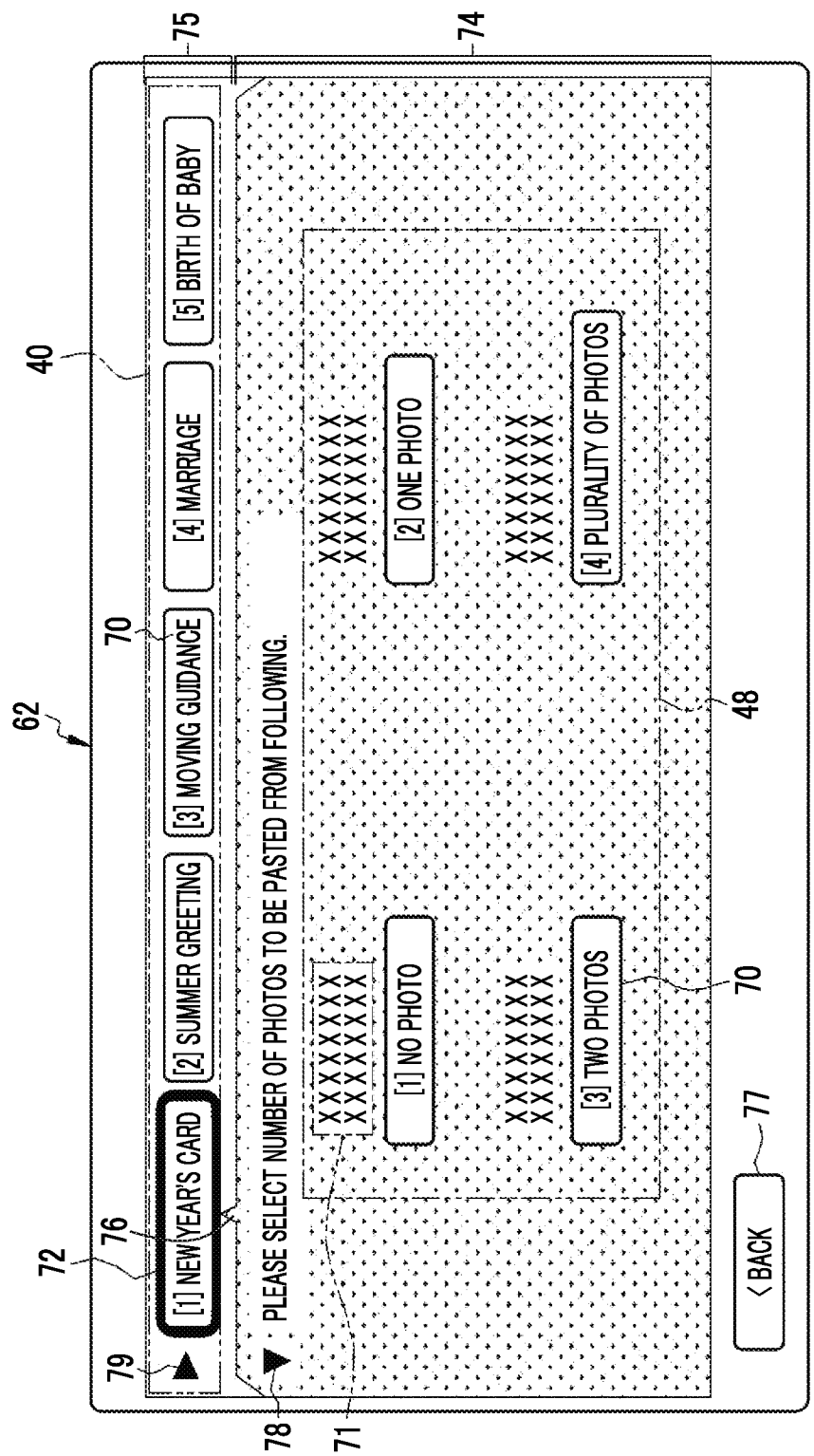
FIG. 9 is a diagram illustrating a selection screen in which a number-of-sheet submenu is displayed in a main display region.

In a case where, for example, the selection button 70 of "New Year's card" is touched by the finger F in the selection screen 62 of FIG. 6 such that the "New Year's card" is selected as the first option 44, the GUI control unit 60 causes the selection screen 62 of FIG. 6 to sequentially transition to display states illustrated in FIGS. 7, 8, and 9.

In FIG. 7, the selection button 70 of "New Year's card" that is being selected is displayed to be identifiable from the other unselected selection buttons 70. A display form of the selection button 70 that is being selected is, for example, a form in which a selection mark 72 surrounding the selection button 70 is displayed. The selection mark 72 has a color (for example, orange) different from background color (for example, white) of the selection screen 62. Further, a check mark 73 is displayed over the selection button 70 of the "New Year's card" that is being selected. In the unselected selection buttons 70 other than the "New Year's card", the selection mark 72 and the check mark 73 are not displayed. Through the display of the selection mark 72 and the check mark 73, the selection of the "New Year's card" as the first option 44 is shown to the user. After the display state of FIG. 7 lasts for example several seconds, the selection screen 62 transitions as illustrated in FIG. 8.

In FIG. 8, the respective selection buttons 70 displayed at wide intervals in an entire area of the selection screen 62 are moved to an upper region of the selection screen 62 with an animation representation as indicated by dotted arrows, aligned in a row in an order of the numbers after the hyphens of the option IDs, and aggregated in the upper region at narrower intervals than in FIGS. 6 and 7. In the respective selection buttons 70 aggregated in the upper region, detailed information 71 is not displayed.

Further, at the same time as the aggregation of the respective selection buttons 70 to this upper region, the second hierarchical menu 41 and, more specifically, a number-of-sheet submenu 48 of the second hierarchical menu 41 linked to the "New Year's card" that is being selected appears in a lower portion of the selection screen 62 with an animation representation as indicated by a dotted arrow. The animation representation is, for example, a form in which the number-of-sheet submenu 48 is scrolled up from the bottom to the top of the selection screen 62. As indicated by hatching, the number-of-sheet submenu 48 has background color (for example, gray) different from that of the first hierarchical menu 40. If the aggregation of the respective selection buttons 70 in the upper region illustrated in FIG. 8 and the scroll-up of the number-of-sheet submenu 48 are completed, the selection screen 62 is as illustrated in FIG. 9.

The selection screen 62 in FIG. 9 is divided into a main display region 74 in which the number-of-sheet submenu 48 that is an unselected menu for which selection of an option is not completed is displayed, and a sub display region 75 in which the first hierarchical menu 40 that is a selected option for which selection of the option has ended is displayed. The main display region 74 occupies most of the selection screen 62, and the main display region 74 has a larger display area than the sub display region 75 limited to an upper region of the selection screen 62.

The selection buttons 70 of all the options of the first hierarchical menu 40 that is a combination of the selection button 70 of the "New Year's card" that is being selected and the selection buttons 70 of the unselected options other than the "New Year's card" are displayed in the sub display region 75. Further, in the sub display region 75, the selection can be changed from the selection button 70 of the "New Year's card" that is being selected to the selection button 70 of the unselected option.

The check mark 73 is erased and only the selection mark 72 is displayed in the selection button 70 of "New Year's card" that is being selected among the respective selection buttons 70 of the sub display region 75. Further, a triangular arrow 76 indicating the selection button 70 of "New Year's card" that is being selected among the respective selection buttons 70 of the sub display region 75 is displayed over the number-of-sheet submenu 48. Through the display of the selection mark 72 and the arrow 76, the option selected in the past, that is, a selection route is shown to the user. The arrow 76 may not be displayed and only the selection mark 72 may be displayed.

A message "Please select the number of photos to be pasted from following", the selection buttons 70 for selecting the second options 45 of "No photo", "One photo", "Two photos", and "A plurality of photos (collage)" of the number-of-sheet submenu 48, and detailed information 71 are displayed in the main display region 74. Similar to the selection screen 62 in FIG. 6, the respective selection buttons 70 are aligned in an order of the numbers after the hyphens of the option IDs and displayed at wide intervals in an entire region of the main display region 74. Further, a back button 77 for causing the display state of the selection screen 62 to return to a previous display state (the selection screen 62 in FIG. 6 in the case of FIG. 9) appears in a lower portion of the selection screen 62.

An aggregation button 78 in a triangular arrow shape is displayed next to a message "Please select a use of a postcard from following" in FIGS. 6 and 7 and a message "Please select the number of photos to be pasted from following" in FIG. 9, and a deployment button 79 in the same triangular arrow shape is displayed next to each selection button 70 of the sub display region 75 in FIG. 9.

In the aggregation button 78 next to each message, the triangular arrow is directed downwardly, which indicates that the selection button 70 displayed with the detailed information 71 belongs to the unselected menu in which the selection of the option is not completed. On the other hand, in the deployment button 79 of the sub display region 75, the triangular arrow is directed to each selection button 70, which indicates that each selection button 70 belongs to the selected menu in which the selection of the option is completed. A function of the deployment button 79 will be described below.

Figure 10:
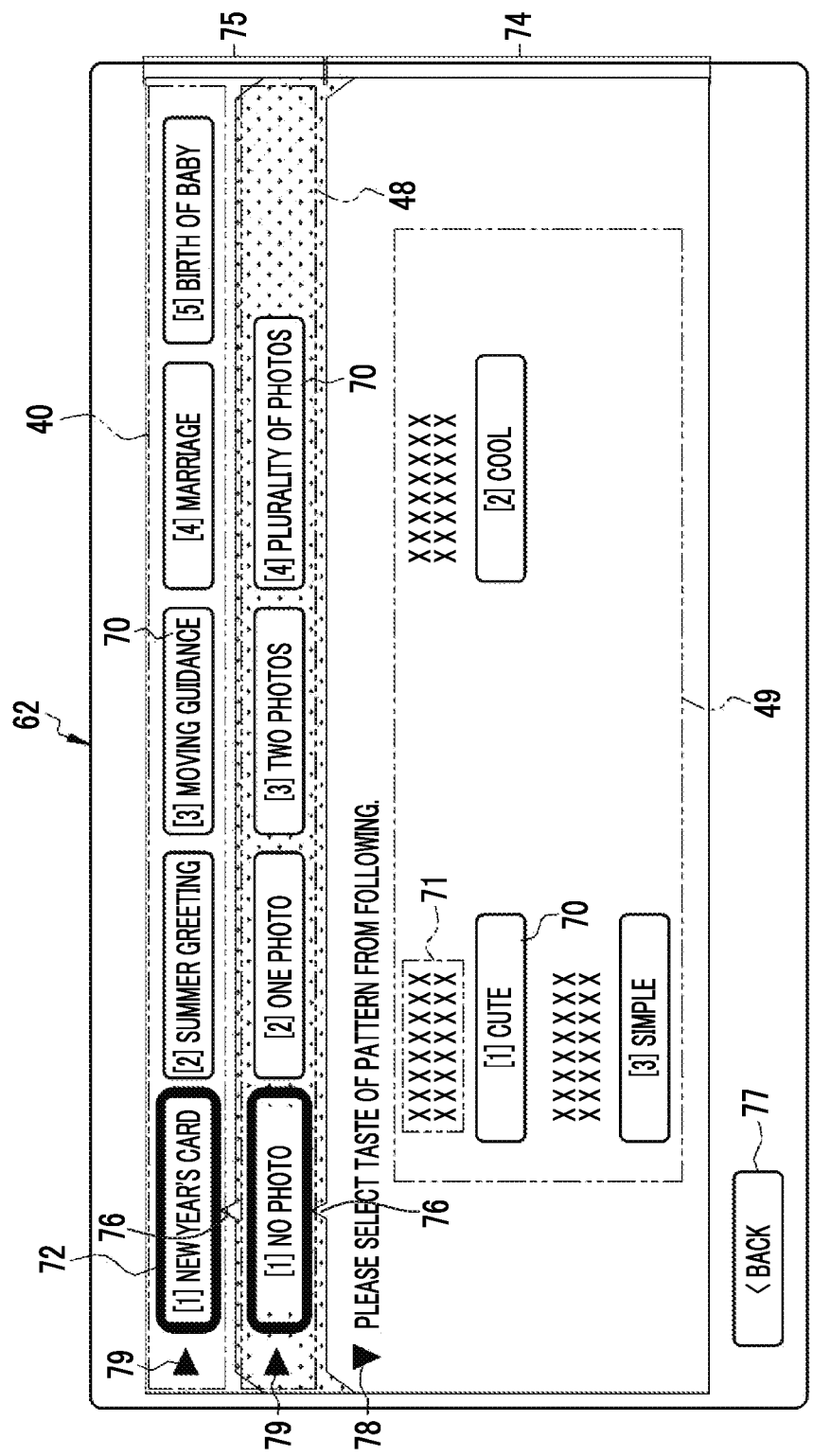
FIG. 10 is a diagram illustrating a selection screen in which a taste submenu is displayed in the main display region.

In the selection screen 62 of FIG. 9, in a case where, for example, the selection button 70 of "No photo" is touched by the finger F and "No photo" is selected as the second option 45, the GUI control unit 60 causes the selection screen 62 of FIG. 9 to transition as in FIGS. 7 and 8, to enter a display state illustrated in FIG. 10.

In FIG. 10, a message "Please select taste of pattern from following" is displayed in the main display region 74. In addition, the selection buttons 70 for selecting third options 46 of "Cute", "Cool", and "Simple" of a taste submenu 49 of the third hierarchical menu 42, more specifically, the third hierarchical menu 42 linked to the first option 44 "New Year's card" and the second option 45 "No photo" that are being selected, and detailed information 71 are displayed.

The taste submenu 49 is scrolled up from the bottom of the selection screen 62 with an animation representation, similar to the number-of-sheet submenu 48 of FIG. 8. Further, background color of the taste submenu 49 is background color (for example, white) that is the same as that of the first hierarchical menu 40 that is a two-step high level menu and is different from the number-of-sheet submenu 48 that is a one-step high level menu.

Meanwhile, in the sub display region 75, respective selection buttons 70 of the number-of-sheet submenu 48 are displayed under the first hierarchical menu 40. For each selection button 70 of the number-of-sheet submenu 48, the selection can also be changed from the selection button 70 of "No photo" that is being selected to the selection button 70 of the unselected option. Further, a deployment button 79 is displayed next to each selection button 70 of the number-of-sheet submenu 48.

The same selection mark 72 as that of the selection button 70 of "New Year's card" is displayed in the selection button 70 of "No photo" that is being selected among the selection buttons 70 of the number-of-sheet submenu 48. Further, an arrow 76 pointing to the selection button 70 of "No photo" is displayed on the taste submenu 49, similar to the number-of-sheet submenu 48.

The respective selection buttons 70 of the number-of-sheet submenu 48 are aggregated in the sub display region 75, similar to the respective selection buttons 70 of the first hierarchical menu 40 in FIG. 8. A display area of the sub display region 75 is larger than that in the case of FIG. 9 due to addition of the number-of-sheet submenu 48 in addition to the first hierarchical menu 40, and the main display region 74 still has a larger display area than the sub display region 75.

Figure 11:
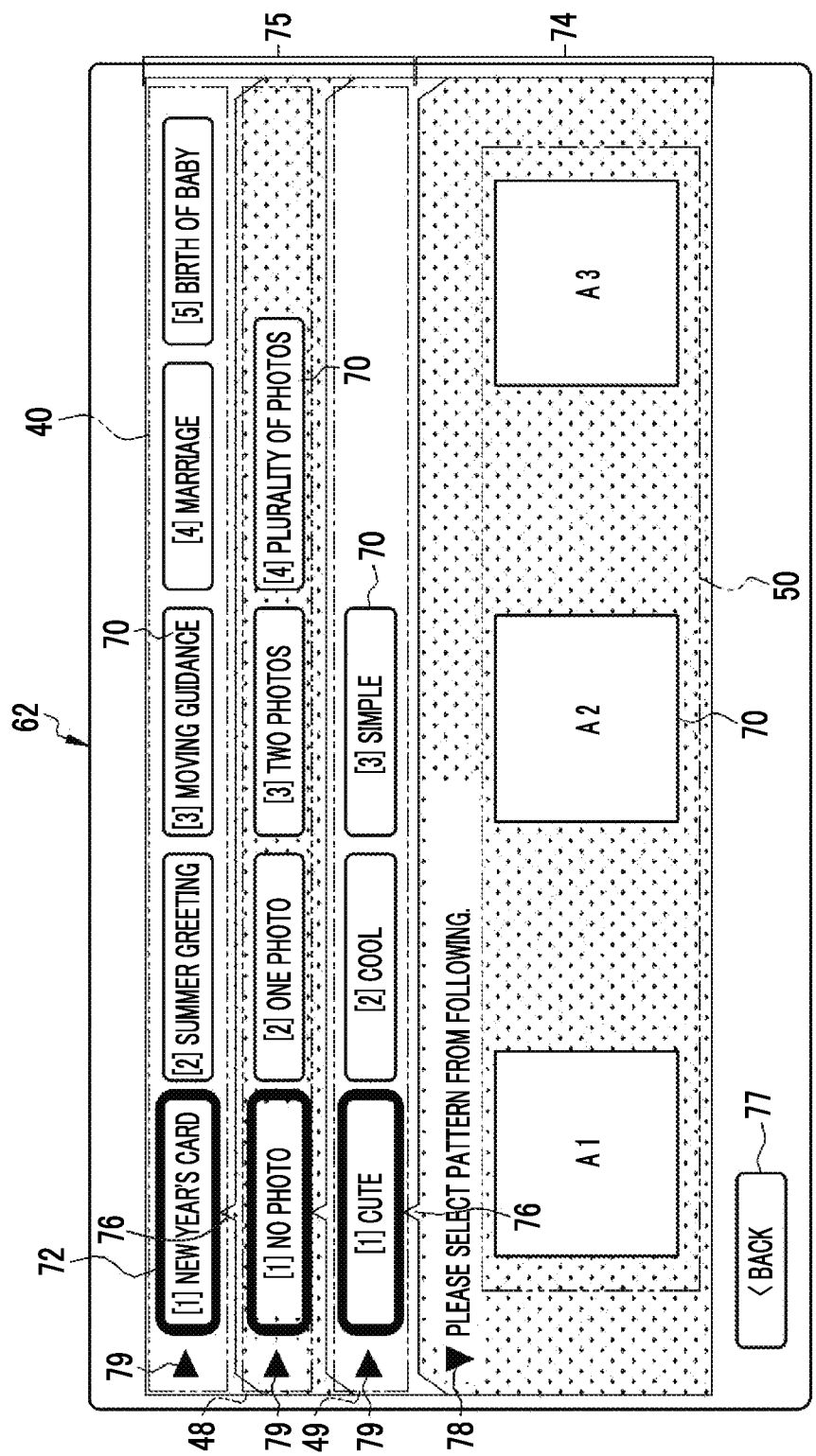
FIG. 11 is a diagram illustrating a selection screen in which a pattern submenu is displayed in the main display region.

In the selection screen 62 of FIG. 10, in a case where, for example, the selection button 70 of "Cute" is touched by the finger F and "Cute" is selected as the third option 46, the GUI control unit 60 causes the selection screen 62 in FIG. 10 to transition, as in FIGS. 7 and 8, to enter a display state illustrated in FIG. 11.

In FIG. 11, a message "Please select pattern from following" is displayed in the main display region 74. In addition, the selection buttons 70 for selecting the fourth options 47 of "A1", "A2", and "A3" of the pattern submenu 50 of the fourth hierarchical menu 43, more specifically, the fourth hierarchical menu 43 linked to the first option 44 "New Year's card", the second option 45 "No photo", and the third option 46 "Cute" that are being selected are displayed. In this case, thumbnail images of the pattern of the postcard are displayed as the selection buttons 70, and detailed information 71 is not displayed.

A way of appearance of the pattern submenu 50 and a way of the aggregation of the respective selection buttons 70 of the taste submenu 49 in the sub display region 75 are the same as a way of the appearance of the number-of-sheet submenu 48 and a way of the aggregation of the respective selection buttons 70 of the first hierarchical menu 40 in FIG. 8. Further, background color of the pattern submenu 50 is different from those of the first hierarchical menu 40 and the taste submenu 49 and is the same as the background color of the number-of-sheet submenu 48. Thus, it is easy to identify the respective hierarchical menus by alternately changing the background colors of the respective hierarchical menus for each hierarchy.

In the sub display region 75, each selection button 70 of the taste submenu 49 is displayed under the first hierarchical menu 40 and the number-of-sheet submenu 48. For each selection button 70 of the taste submenu 49, the selection can be changed from the selection button 70 of "Cute" that is being selected to the selection button 70 of the unselected option. Further, the deployment button 79 is displayed next to each selection button 70 of the taste submenu 49.

The selection mark 72 is also displayed in the selection button 70 of "Cute" that is being selected among the respective selection buttons 70 of the taste submenu 49. Further, an arrow 76 indicating the selection button 70 of "Cute" is also displayed on the pattern submenu 50. Further, a display area of the sub display region 75 is substantially the same as that of the main display region 74.

Thus, in the selection screen 62, hierarchical menus appear in an order from a high-level hierarchy according to a selection instruction of the respective options 44 to 47. Further, in the selection screen 62, the first to third options 44 to 46 selected in the first to third hierarchical menus 40 to 42 can be changed until the selection of the fourth option 47 is determined. That is, each selection button 70 of the sub display region 75 serves as a so-called tab, and is configured so that the unselected menu displayed in the main display region 74 is switched according to a change from the selection button 70 of the option that is being selected to the selection button 70 of the unselected option as described below.

The user selects the options in an order from the higher level hierarchy to cause the pattern submenu 50 to appear in the main display region 74, as illustrated in the selection screen 62 illustrated in FIG. 11. In such a selection screen 62, in a case where the selection is changed from the selection button 70 of the option that is being selected to the selection button 70 of the unselected option, the user touches a desired selection button 70 among the selection buttons 70 of the unselected options displayed in the sub display region 75 with the finger F to select the selection button 70.

Figure 12:
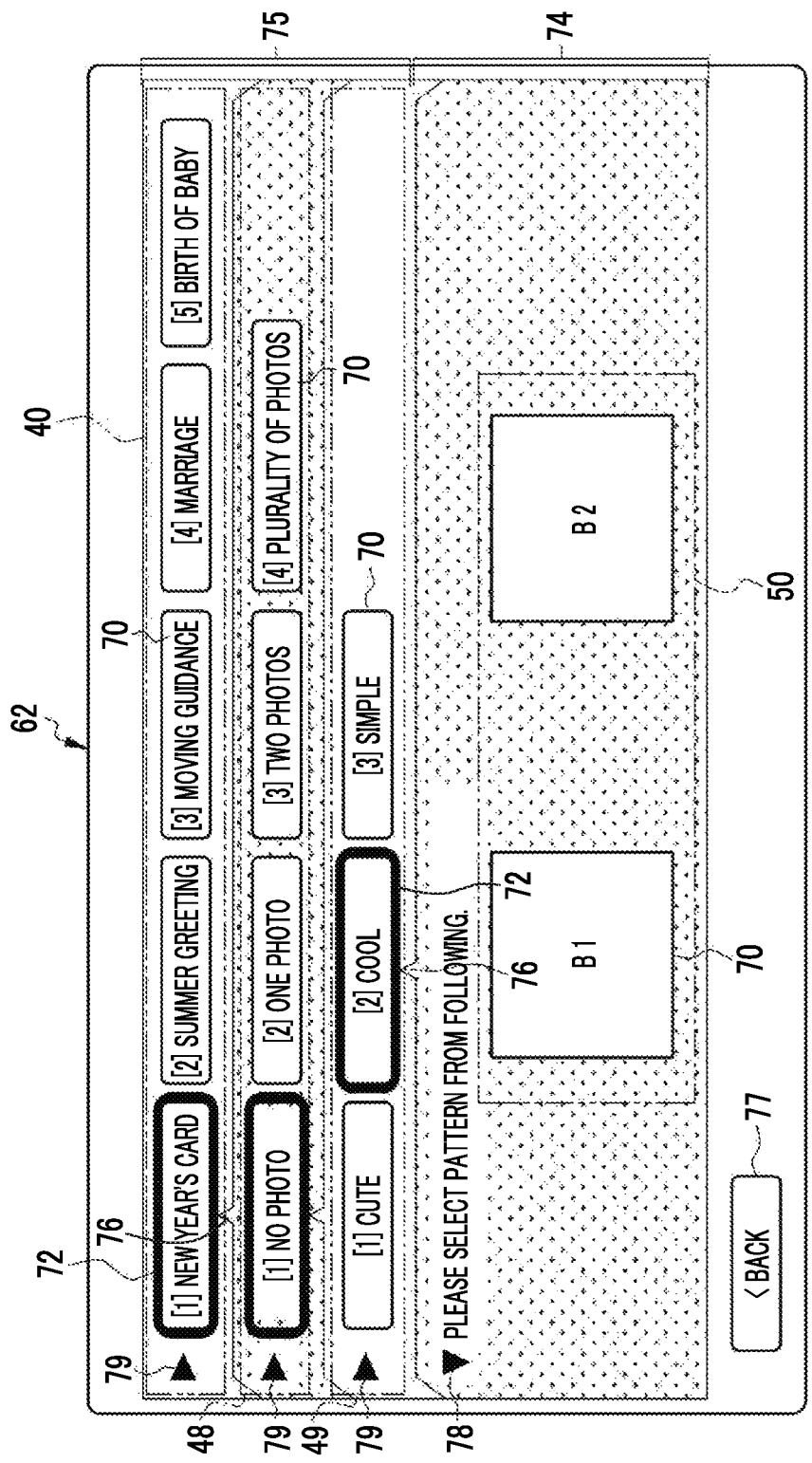
FIG. 12 is a diagram illustrating a selection screen in a case where a third option is changed from "Cute" to "Cool" in FIG. 11.

For example, in a case where the selection button 70 of "Cool" of the taste submenu 49 is touched by the finger F in the selection screen 62 of FIG. 11 so that the selection button 70 of the taste submenu 49 is changed from "Cute" to "Cool", the GUI control unit 60 causes the selection screen 62 of FIG. 11 to transition to the display state illustrated in FIG. 12.

In FIG. 12, the selection buttons 70 for selecting the fourth options 47 of "B1" and "B2" of another pattern submenu 50 of the fourth hierarchical menu 43 linked to the first option 44 "New Year's card", the second option 45 "No photo", and the third option 46 "Cool" are displayed in the main display region 74 in place of the pattern submenu 50 of the fourth hierarchical menu 43 linked to the first option 44 "New Year's card", the second option 45 "No photo", and the third option 46 "Cute" in FIG. 11. Further, the display of the selection mark 72 of the taste submenu 49 is switched from the selection button 70 of "Cute" in FIG. 11 to the selection button 70 of the changed "Cool". Further, a display position of the arrow 76 of the pattern submenu 50 is switched from the position at which the selection button 70 of "Cute" in FIG. 11 is pointed to a position at which the selection button 70 of the changed "Cool" is pointed.

Figure 13:
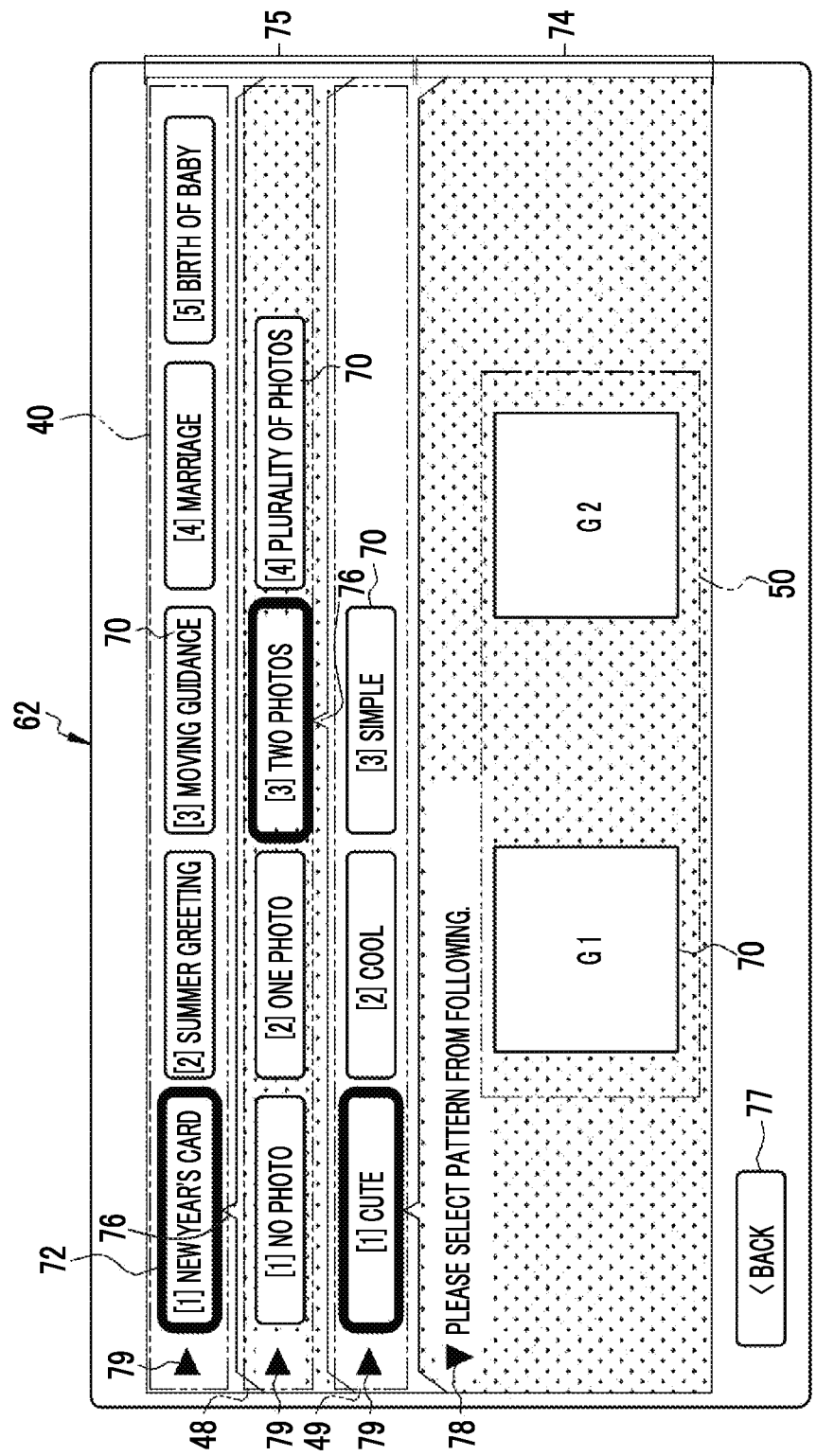
FIG. 13 is a diagram illustrating a selection screen in a case where a second option is changed from "No photo" to "Two photos" in FIG. 11.

Further, for example, in a case where the selection button 70 of "2 Photos" of the number-of-sheet submenu 48 is touched by the finger F in the selection screen 62 of FIG. 11 so that the selection button 70 of the number-of-sheet submenu 48 is changed from "no photo" to "2 photos", the GUI control unit 60 causes the selection screen 62 of FIG. 11 to transition to the display state illustrated in FIG. 13.

In FIG. 13, the selection buttons 70 for selecting the fourth options 47 of "G1" and "G2" of another pattern submenu 50 of the fourth hierarchical menu 43 linked to the first option 44 "New Year's card", the second option 45 "Two photos", and the third option 46 "Cute" are displayed in the main display region 74 in place of the pattern submenu 50 of the fourth hierarchical menu 43 linked to the first option 44 "New Year's card", the second option 45 "No photo", and the third option 46 "Cute" in FIG. 11. Further, the display of the selection mark 72 of the number-of-sheet submenu 48 is switched from the selection button 70 of "No photo" in FIG. 11 to the selection button 70 of the changed "Two photos". Further, a display position of the arrow 76 of the taste submenu 49 is switched from the position at which the selection button 70 of "No photo" in FIG. 11 is pointed to a position at which the selection button 70 of the changed "Two photos" is pointed.

Thus, in a case where an instruction to change the option (in this example, the option of "No photo") present in a selection route directed to a common option that is being currently selected into another option (in this example, an option of "Two photos") in the hierarchical menu at a higher level than the common hierarchical menu (in this example, the number-of-sheet submenu 48 at a higher level than the taste submenu 49) is received in a state in which one common option of one submenu of the common hierarchical menu is selected (in this example, a state of FIG. 11 in which the option of the third option 46 "Cute" of the taste submenu 49 of the third hierarchical menu 42 linked to the first option 44 "New Year's card" and the second option 45 "No photo" is selected), the GUI control unit 60 outputs information on the instruction, specifically, an option ID of another option (in this example, the option ID "2-003 (two photos)") to the automatic selection unit 61.

The automatic selection unit 61 receives the option ID of another option from the GUI control unit 60, operates, and automatically selects the option. More specifically, the automatic selection unit 61 searches for common options (the options of the third option 46 "Cute" of the taste submenu 49 of the third hierarchical menu 42 linked to the first option 44 "New Year's card" and the second option 45 "Two photos" in this example) that is reachable via the other option and that is the other submenus in the same common hierarchical menu as the common option (the option of "Cute" in this example) selected immediately before the change, and automatically selects the searched common options.

Figure 14:
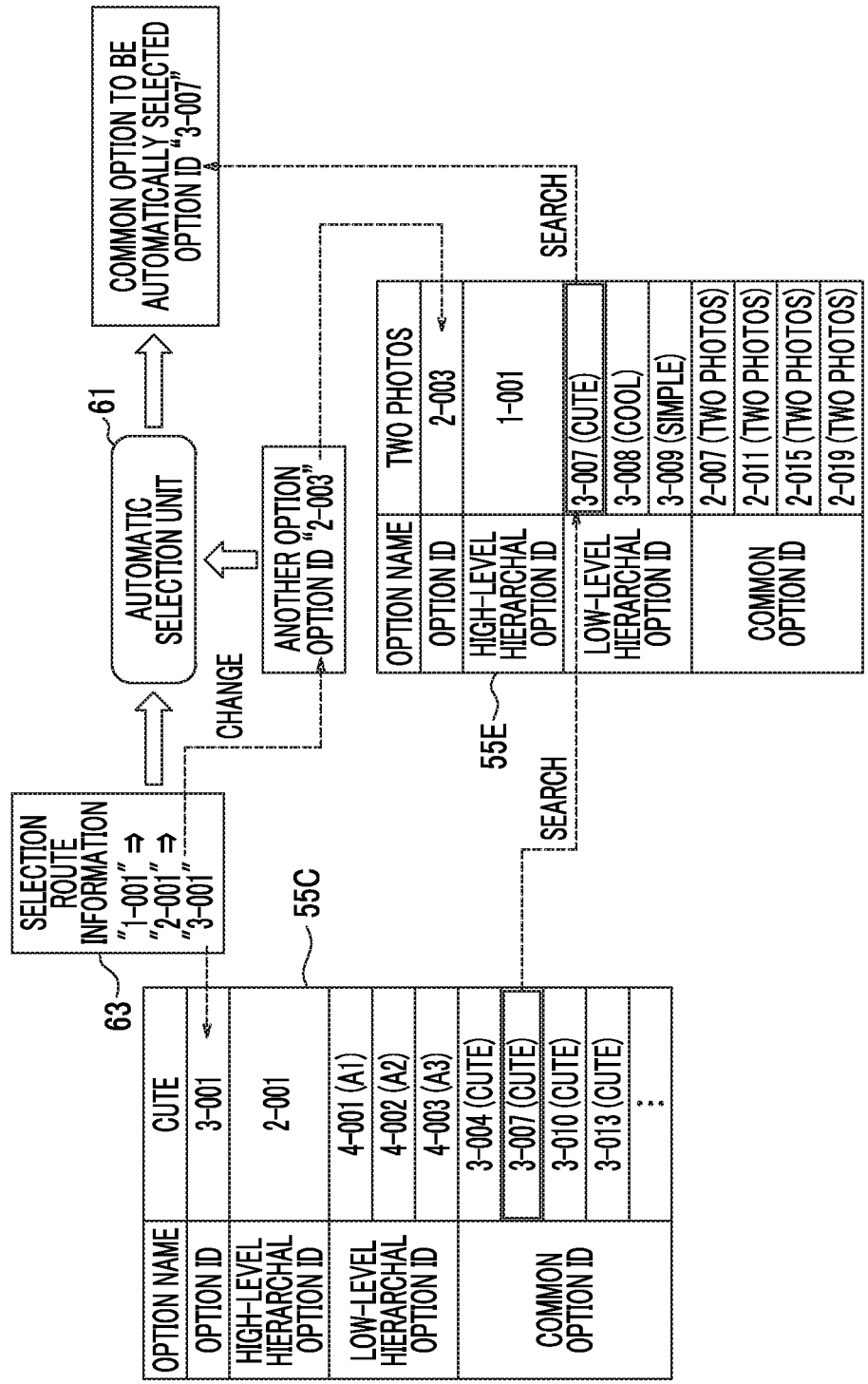
FIG. 14 is an illustrative diagram illustrating a function of an automatic selection unit.

The automatic selection unit 61 performs search of the common option on the basis of the option relationship information 30 and the selection route information 63. In the case of this example, the selection route information 63 in the state of FIG. 11 is "1-001 (New Year's card)"⇒"2-001 (no photo)"⇒"3-001 (cute)", as illustrated in FIG. 5. In a case where the option ID "2-003 (two photos)" of another option is received from the GUI control unit 60 in this state, the automatic selection unit 61 searches for an item of the low-level hierarchal option ID of the information block 55E of the option ID "2-003", and extracts the respective option IDs of "3-007 (cute)", "3-008 (cool)", and "3-009 (simple)", as illustrated in FIG. 14.

Further, the automatic selection unit 61 searches for the item of the common option ID of the information block 55C with the option ID "3-001 (cute)" that is a common option selected immediately before the change, which is recorded in the selection route information 63, and determines whether or not the same option ID as each option ID extracted from the information block 55E is registered.

The same option ID as the option ID extracted from the information block 55E, that is, the option ID "3-007" is registered in an item of the common option ID of the information block 55C. Therefore, the automatic selection unit 61 extracts this option ID "3-007" as an option ID to be automatically selected. The automatic selection unit 61 outputs a search result to the GUI control unit 60. The GUI control unit 60 causes the selection screen 62 in FIG. 11 to transition to the display state of FIG. 13 on the basis of the search result from the automatic selection unit 61.

Figure 15:
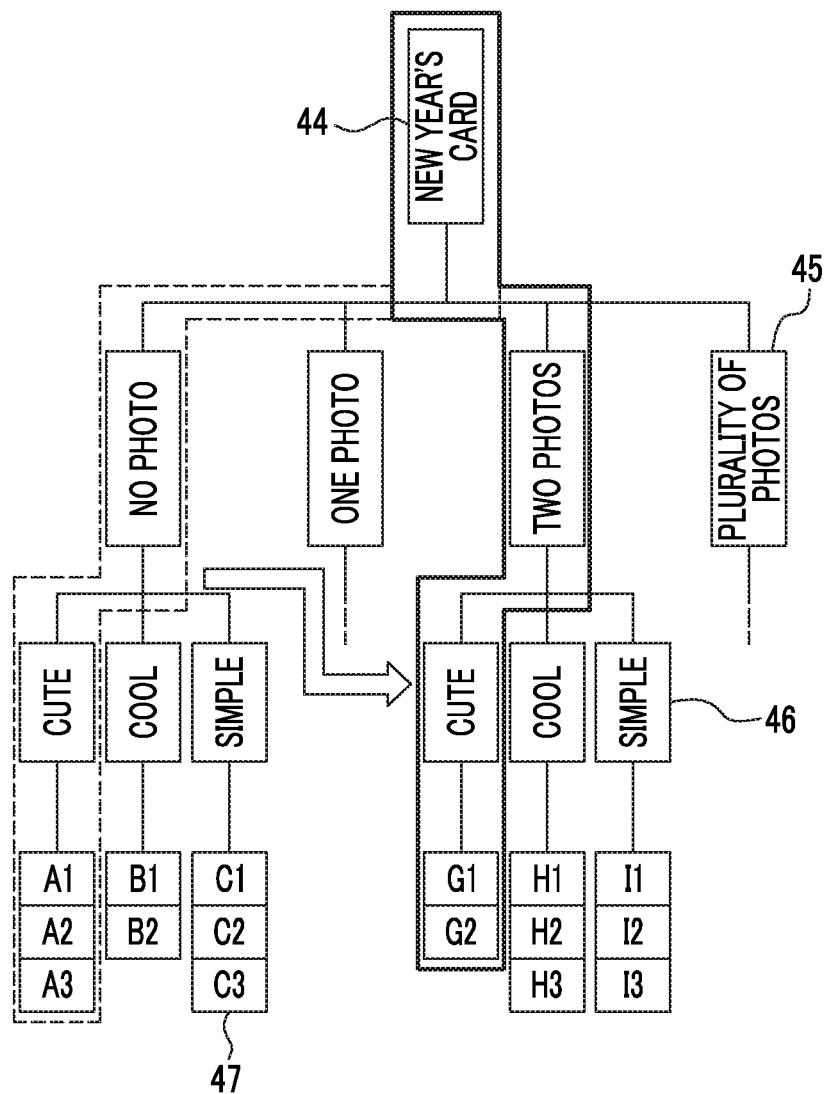
FIG. 15 is an illustrative diagram illustrating selection routes before a change and after the change.

In the example of FIGS. 11 and 13, the selection route of the first to third options 44 to 46 is changed from a state of the first option 44 "New Year's card", the second option 45 "No photo", and the third option 46 "Cute" surrounded by a dotted line to the first option 44 "New Year's card", the second option 45 "Two photos", and the third option 46 "Cute" surrounded by a solid line, and the fourth option 47 is switched from "A1", "A2", and "A3" to "G1" and "G2", as illustrated in FIG. 15. In FIG. 15, only the options related to the example of FIGS. 11 and 13 are illustrated.

Figure 16:
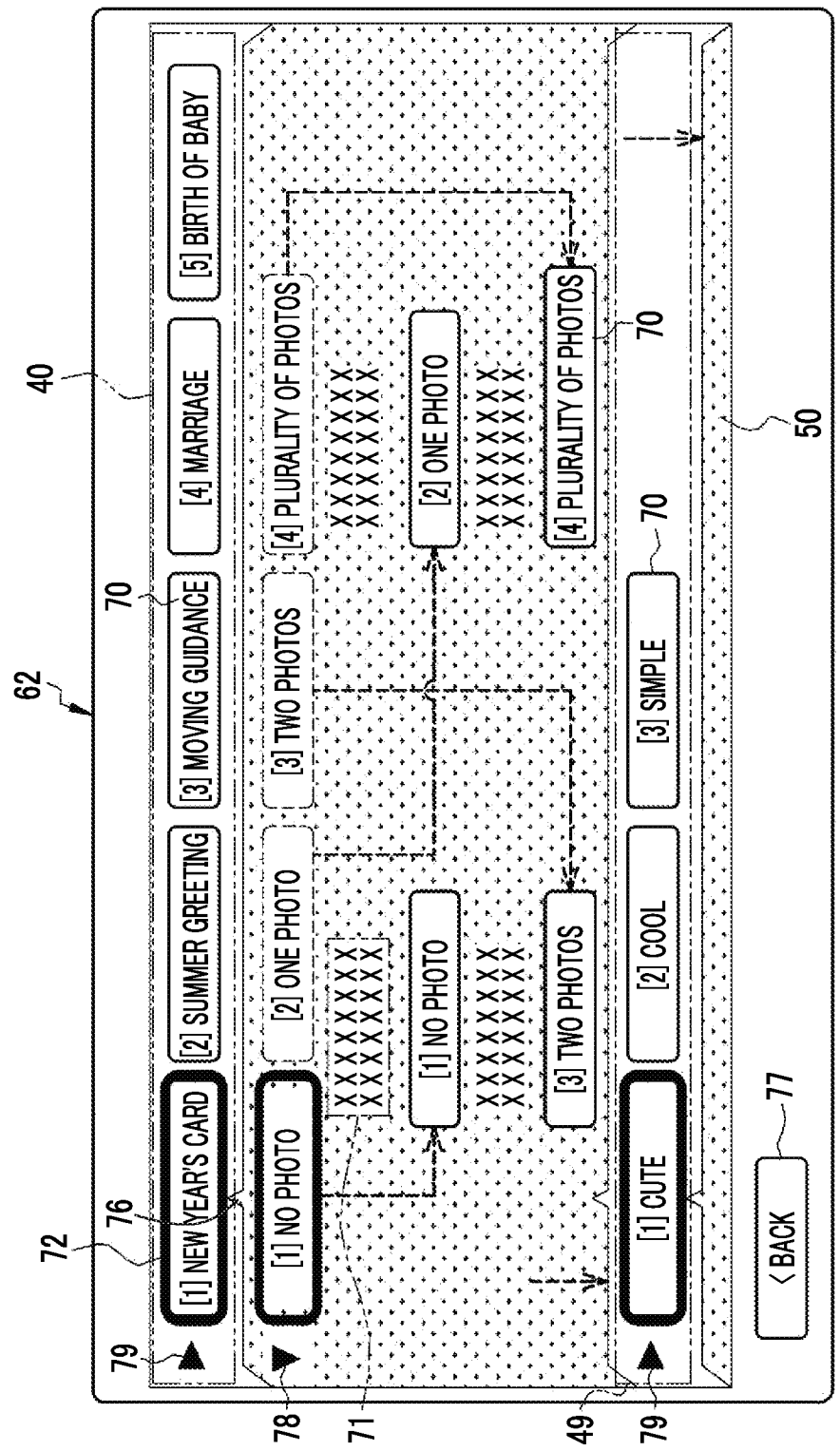
FIG. 16 is a diagram illustrating a transition of a display state of a selection screen in a case where a selection instruction of a deployment button is received.

Further, for example, in a case where the deployment button 79 of the number-of-sheet submenu 48 is touched by the finger F in the selection screen 62 illustrated in FIG. 11 so that an instruction to select the deployment button 79 is received, the GUI control unit 60 causes the selection screen 62 of FIG. 11 to transition to the display state illustrated in FIGS. 16 and 9.

In FIG. 16, the respective selection buttons 70 of the number-of-sheet submenu 48 aggregated in the sub display region 75 are moved to be distributed in an entire region of the selection screen 62 with an animation representation as indicated by a dotted arrow. Detailed information 71 not displayed in the sub display region 75 is displayed over each selection button 70, and a display of the detailed information 71 is resurrected. Further, the deployment button 79 next to the number-of-sheet submenu 48 is changed to the aggregation button 78 with a downward triangular arrow.

Further, at the same time as the movement of each selection button 70 to this entire region, the pattern submenu 50 displayed in the main display region 74 and the taste submenu 49 displayed in the sub display region 75 are scrolled down to the bottom of the selection screen 62 with an animation representation as indicated by a dotted arrow. Through the display state illustrated in FIG. 16, the selection screen 62 enters the display state illustrated in FIG. 9. That is, through the selection of the deployment button 79, the number-of-sheet submenu 48 that is a selected menu is returned to and displayed in the main display region 74 in place of an unselected menu.

In a case where the selection instruction of the aggregation button 78 next to the message "Please select number of photos to be pasted from following" in FIG. 9 is received after the selection screen 62 transitions from the display state of FIG. 11 to the display state illustrated in FIGS. 16 and 9 according to reception of the instruction to select the deployment button 79, the respective selection buttons 70 of the number-of-sheet submenu 48 may be aggregate in the sub display region 75 again, the display of the pattern submenu 50 and the taste submenu 49 may be resurrected, and the selection screen 62 may be returned to the display state of FIG. 11.

Hereinafter, an operation of the above configuration will be described with reference to a flowchart of FIG. 17. First, in the print order reception device 2, the operating program 29 is started up. Accordingly, the GUI control unit 60 and the automatic selection unit 61 are built in the CPU 24, and the print order reception device 2 functions as the multi-hierarchical menu selection device.

First, an initial screen (not illustrated) for receiving a print order is output to the touch panel display 11 by the GUI control unit 60. In the initial screen, a message for prompting the touch panel display 11 to be touched with the finger F, such as "Please touch the screen.", is displayed. If the initial screen being touched with the finger F is detected, then a screen (not illustrated) on which a message for prompting a removable medium to be inserted into the medium slot group 10, such as "Please insert a medium having photographs recorded thereon into a medium slot.", and an animation indicating a state in which the removable medium is inserted into the medium slot group 10 are displayed is output to the touch panel display 11.

In a case where insertion of the removable medium into the medium slot group 10 is detected by the medium reader 22, the selection screen 62 of FIG. 6 in which the selection buttons 70 for selecting the respective first options 44 of the first hierarchical menu 40 are displayed is output to the touch panel display 11 by the GUI control unit 60.

In the selection screen 62 of FIG. 6, in a case where a desired selection button 70 is selected, the display state transitions as illustrated in FIGS. 7 and 8, and then, the selection screen 62 in which the number-of-sheet submenu 48 is displayed in the main display region 74 and the first hierarchical menu 40 is displayed in the sub display region 75 is output to the touch panel display 11, as illustrated in FIG. 9.

The selection mark 72 is displayed in the selected selection button 70 among the respective selection buttons 70 in the sub display region 75. Further, the arrow 76 pointing to the selected selection button 70 is displayed on the number-of-sheet submenu 48. Since the selection route is shown to the user by the selection mark 72 and the arrow 76, the user need not remember the selected options each time and can easily confirm the selection route. Further, the options of the hierarchical menus that are being currently selected can be recognized by at a glance.

Since the main display region 74 has a larger display area than the sub display region 75, unselected menus for which selection of the option has not been completed can be greatly displayed on the entire selection screen 62. Further, since the selection buttons 70 are arranged at wide intervals in the main display region 74, selection of the selection button 70 of the option of the unselected menu is easy and operability is improved.

Further, since the selection buttons 70 of all the options of the selected menu that is a combination of the option that is being selected and the unselected option are displayed in the sub display region 75, and the selection buttons 70 of the unselected options are displayed to be changeable from the selected option, an instruction to change the selection from the selection button 70 of the option that is being selected to the selection button 70 of the unselected option is easily performed and operability is improved. The user can simply find a pattern of a favorite postcard by feeling free to change the selection button 70 and viewing or comparing patterns of various postcards.

Further, since the detailed information 71 is displayed in the main display region 74, the user can select the selection button 70 by referring to the detailed information 71. On the other hand, since the detailed information 71 is not displayed in the sub display region 75, it is possible to decrease the display area of the sub display region 75 and, in other words, it is possible to increase the display area of the main display region 74.

Since the desired selection button 70 of the number-of-sheet submenu 48 and the desired selection button 70 of the taste submenu 49 are sequentially selected, the display state of the selection screen 62 transitions, for example, from FIG. 9 to FIGS. 10 and 11.

In a case where the selection button 70 of the unselected option of the hierarchical menu at a one-step higher level than the unselected menu is selected as the instruction to change the selection from the selection button 70 of the option that is being selected to the selection button 70 of the unselected option in the selection screen 62 on which the main display region 74 and the sub display region 75 as illustrated in FIG. 11 are displayed (for example, in a case where the selection button 70 of the taste submenu 49 is changed from "cute" to "Cool" in the selection screen 62 of FIG. 11), the GUI control unit 60 outputs, to the touch panel display 11, the selection screen 62 in which another submenu (for example, another pattern submenu 50 of the fourth hierarchical menu 43 linked to "New Year's card", "No photo", and "Cool" in FIG. 12) linked to the option for which the change instruction is received is displayed as the unselected menu in the main display region 74, in place of the unselected menu displayed before the change instruction is received (for example, the pattern submenu 50 of the fourth hierarchical menu 43 linked to "New Year's card", "No photo", and "Cute" FIG. 11).

Figure 17:
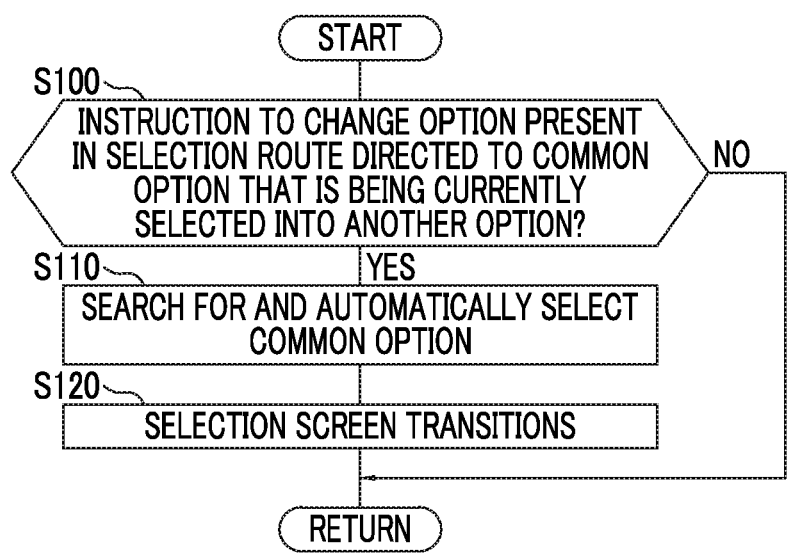
FIG. 17 is a flowchart illustrating a procedure of an operation of a CPU of a print order reception device in a case where an instruction to change an option from an option present in a selection route directed to a common option that is being currently selected to another option is received.

Further, as illustrated in FIG. 17, in a case where an instruction to change the option (in this example, the option of "No photo") present in a selection route directed to a common option that is being currently selected into another option (for example, an option of "Two photos") in the hierarchical menu at a higher level than the common hierarchical menu (in this example, the number-of-sheet submenu 48) is received in a state in which one common option of one submenu of the common hierarchical menu is selected (for example, a state of FIG. 11 in which the option of "Cute" of the taste submenu 49 of the third hierarchical menu 42 linked to "New Year's card" and "No photo" is selected) (YES in step S100), the automatic selection unit 61 searches for and automatically selects a common option (an option of "Cute" with the option ID "3-007" linked to "New Year's card" and "Two photos") that is reachable via the other option and that is the other submenus in the same common hierarchical menu as the common option (the option of "Cute" of the option ID "3-001" linked to "New Year's card" and "No photo") selected immediately before the change (step S110).

The GUI control unit 60 switches the display of the selection mark 72 and the arrow 76, that is, the display of the selection route of the sub display region 75 according to a result of the search from the automatic selection unit 61. Further, another submenu linked to the option for which the change instruction is received (for example, another pattern submenu 50 of the fourth hierarchical menu 43 linked to "New Year's card", "Two photos", and "Cute" in FIG. 13) is displayed as the unselected menu in the main display region 74, and the display state of the selection screen 62 transitions (step S120).

In a case where the option present in the selection route directed to the common option that is being currently selected is changed into another option, the common options that is reachable via the other option and that is the other submenus in the same common hierarchical menu as the common option selected immediately before the change is selected automatically. Therefore, it is possible to respond to user's desire to confirm the option of a low-level hierarchy of the selection route via another option while taking advantage of the common option selected immediately before the change. After a change into another option, an operation of changing the common option selected immediately before a further change of the common option is not necessary, and efforts of the option changing operation are reduced.

More specifically, a case where the technology described in JP2002-116857A is applied is conceivable. In this case, for example, in a case where the user recently selects the first option 44 "New Year's card", the second option 45 "Two photos", and the third option 46 "Cool" immediately previously, the user selects the first option 44 "New Year's card", the second option 45 "No photo", and the third option 46 "Cute", and in a case where the second option 45 is changed from "No photo" to "Two photos", "Cool" that is the recent option selected immediately previously by the user, rather than "Cute" selected by the user before the change, is automatically selected in the third option 46. As a result, a user's demand before a change for selection of a postcard with a "Cute" pattern is not reflected. Therefore, after the user changes the second option 45 from "No photo" to "Two photos", the user must change the third option 46 from "Cool" to "Cute". In the present invention, such double efforts do not occur.

Further, in a case where an instruction to select the deployment button 79 is received in the selection screen 62 in which the main display region 74 and the sub display region 75 as illustrated in FIG. 11 are displayed, the GUI control unit 60 outputs, to the touch panel display 11, the selection screen 62 in which the selected menu pointed by the deployment button 79 returns and is displayed in the main display region 74 in place of the unselected menu. It is possible to cause the desired selected menu to quickly return to the unselected menu in comparison with causing the unselected menu to return by one hierarchy by selecting the back button 77, and to save labor of the operation. Since the selected menu returns and is displayed in place of the unselected menu, the display of the detailed information 71 is also resurrected, it is also suitable even in a case where the detailed information 71 is desired to be confirmed again.

In a case where any one of the selection buttons 70 in the main display region 74 is touched with the finger F in the selection screen 62 in which the pattern submenu 50 is displayed in the main display region 74 as in the selection screen 62 in FIG. 11, and one desired fourth option 47 is selected, the selection of the fourth option 47 is established.

In a case where the selection of the fourth option 47 is established, an image of a pattern of the selected postcard is displayed, and an operation screen (not illustrated) having a function of designating a photo to be pasted to the postcard (this function is not provided in a case where "No photo" is selected in the second option 45), and a function of inputting the number of prints and a character string to be inserted into the postcard is output to the touch panel display 11. The user appropriately designates the photo on this operation screen or inputs the number of prints or the character string, and then, establishes the print order.

In a case where the print order is established, the CPU 24 causes the payment to be collected from the user via the payment settlement unit 23, delivers information such as an image of a pattern of a selected postcard, an affixed designated photo, the number of prints, and a character string to the printer 20, and then causes the printer 20 to perform printing of the postcard according to the print order. Further, the CPU 24 causes the receipt printer 21 to perform printing of a receipt on the basis of the information on the money transmitted from the payment settlement unit 23, the inserted amount, and the change amount. The user receives the postcard from the postcard discharge port 12 and receives the receipt from the receipt discharge port 15.

For example, an automatic selection ON/OFF button may be provided on the selection screen 62 such that ON/OFF of a function of automatic selection of the common option by the automatic selection unit 61 can be switched between. Further, as the operation of causing the selected menu to return to and be displayed in the main display region 74 in place of the unselected menu, for example, a double tap operation of double tapping a background of the selected menu with the finger F may be employed in place of or in addition to the selection of the deployment button 79.

Second Embodiment

In the selection screen 62 of FIG. 11 or the like in which the pattern submenu 50 of the fourth hierarchical menu 43 that is the last hierarchical menu is displayed in the main display region 74, the number of hierarchical menus displayed in the sub display region 75 increases. Therefore, the display area of the sub display region 75 is larger than that of than the selection screen 62 of FIG. 9 or 10, and the display area of the main display region 74 is oppressed.

Then, it is difficult to select the selection button 70 of the option of the unselected menu.

Therefore, in this embodiment, the number of selected menus that can be displayed in the sub display region 75 is set in advance, and in a case where the number of selected menus exceeds the set number, the selected menus are hidden in an order from the selected menus of the hierarchy at a higher level. A hidden menu presence mark indicating that there is a hidden selected menu is displayed in the sub display region 75, and in a case where an instruction to select the hidden menu presence mark is received by the instruction reception unit, the hidden selected menu is re-displayed. As the number of the selected menus that can be displayed in the sub display region 75, the number of selected menus is set to the extent that the display area of the main display region 74 is larger than the display area of the sub display region 75, for example.

The set number of selected menus that can be displayed in the sub display region 75 is, for example, two. In this case, the GUI control unit 60 outputs the selection screen 62 illustrated in FIG. 18 in place of the selection screen 62 of FIG. 11 to the touch panel display 11.

Figure 18:
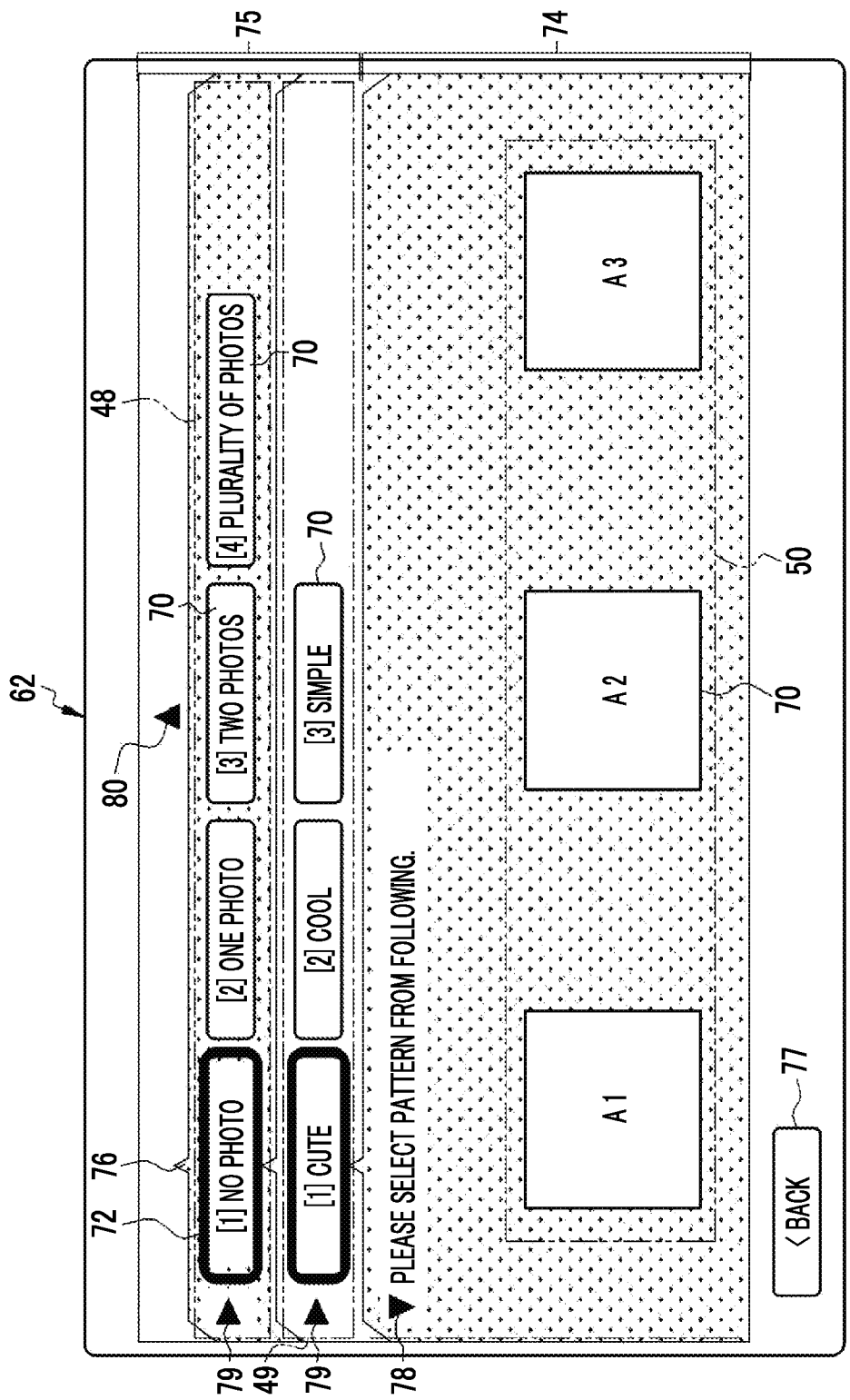
FIG. 18 is a diagram illustrating a selection screen of a second embodiment in which menus are hidden in an order from selected menus of high-level hierarchies in a case where the number of selected menus exceeds a set number.

In the selection screen 62 of FIG. 11, the number of selected menus displayed in the sub display region 75 is three and exceeds the set number of 2. Therefore, in the selection screen 62 of FIG. 18, the first hierarchical menu 40 that is the selected menu at the top level hierarchy among the three selected menus is hidden. The hidden menu presence mark 80 is displayed in the sub display region 75. The hidden menu presence mark 80 has a triangular arrow shape, similar to the aggregation button 78. In FIG. 18, the triangular arrow is directed upwardly.

Figure 19:
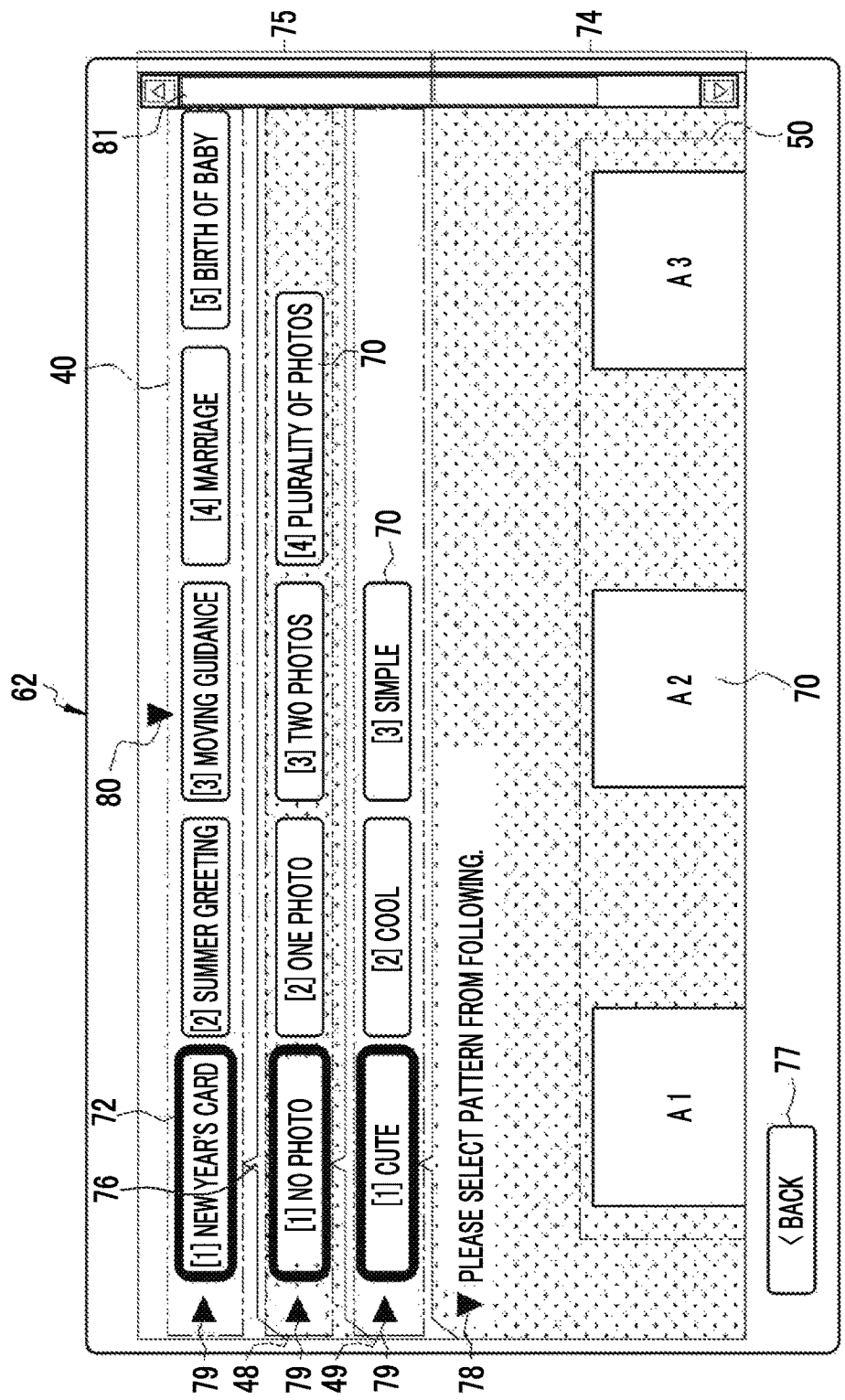
FIG. 19 is a diagram illustrating a selection screen in which hidden selected menus are re-displayed.

In a case where this hidden menu presence mark 80 is touched by the finger F so that a selection instruction of the hidden menu presence mark 80 is received, the GUI control unit 60 causes the selection screen 62 of FIG. 18 to transition to a display state illustrated in FIG. 19.

A scroll bar 81 for scrolling the display of the selection screen 62 in a vertical direction appears in the selection screen 62 of FIG. 19. By operating the scroll bar 81, the first hierarchical menu 40 hidden in the selection screen 62 of FIG. 18 is re-displayed. Further, in FIG. 19, in the hidden menu presence mark 80, the triangular arrow is directed downwardly, which indicates that the hidden selected menus are re-displayable. If the hidden menu presence mark 80 is selected again in the selection screen 62 of FIG. 19, the selection screen 62 returns to the display state of FIG. 18.

Since the selected menus are hidden in an order from the selected menus of the hierarchy at a higher level in a case where the number of selected menus to be displayed in the sub display region 75 exceeds the set number, it is possible to ensure the display area of the main display region 74. Even when the number of hierarchies increases to some extent, the number of the selected menus to be displayed in the sub display region 75 does not exceed the set number, and thus, the display area of the main display region 74 is ensured. Further, since the selected menu is displayed so that the selected menu can be switched between a non-display and a re-display, it is possible to easily perform confirmation of the selection route even when the number of hierarchies increases to some extent.

In FIGS. 18 and 19, the hidden menu presence mark 80 is first displayed, selection of the hidden menu presence mark 80 is waited for, and the scroll bar 81 is displayed. However, the hidden menu presence mark 80 may not be displayed and the scroll bar 81 may be immediately displayed in a step of FIG. 18. Further, the selection screen 62 may return to the display state of FIG. 18 according to the scroll bar 81 being double tapped in FIG. 19.

In each embodiment, the case where the hierarchical menus are used when the pattern of the postcard is determined in the print order reception device 2 has been illustrated, but the present invention is not limited thereto. For example, the present invention may be applied to a case where an order of a product or a service as a last option is received or the product or the service is searched for at a shopping site on the Internet.

Figure 20:
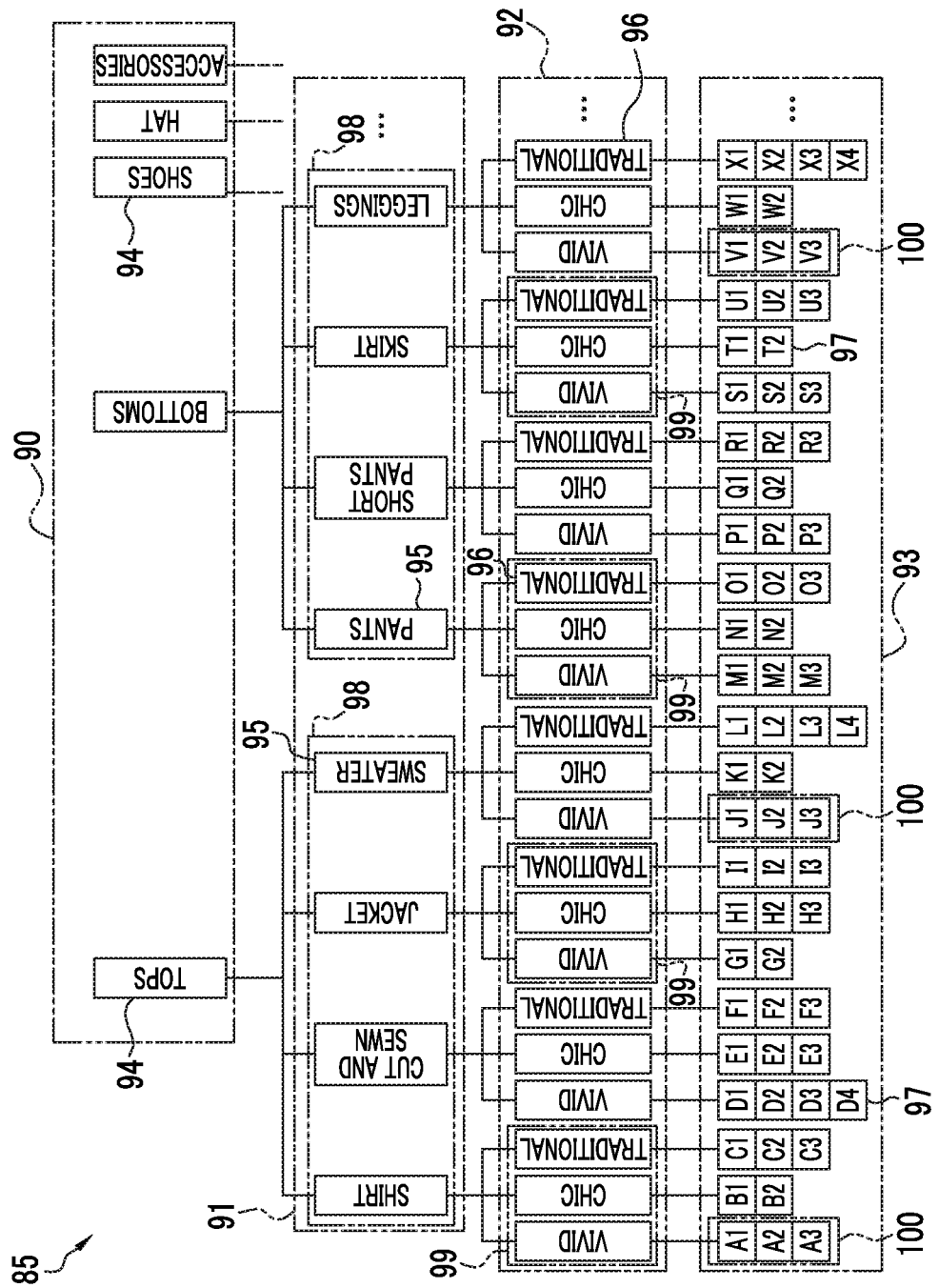
FIG. 20 is a diagram illustrating another example of a multi-hierarchical menu.

The multi-hierarchical menu 85 including the first hierarchical menu 90, the second hierarchical menu 91, the third hierarchical menu 92, and the fourth hierarchical menu 93 illustrated in FIG. 20 is an example of a multi-hierarchical menu in a case where a product as a last option is selected at a shopping site on the Internet. The first option 94 indicating a large classification item of products of "Tops", "Bottoms", "Shoes", "Hat", and "Accessories" is prepared in the first hierarchical menu 90, the second option 95 indicating a small classification item of products of "Shirt", "Cut and sewn", "Jacket", and "Sweater" (the second option linked to the first option "Tops") and "Pants", "Short pants", "Skirt", and "Leggings" (the second option 95 linked to the first option "Bottoms") are prepared in the second hierarchical menu 91, the third option 96 indicating taste of products of "Vivid", "Chic", and "Traditional" is prepared in the third hierarchical menu 92, and products themselves are prepared as the fourth option 97 in the fourth hierarchical menu 93. Similar to the case of FIG. 3, the products of the fourth option 97 are distinguished with signs "A1", "B1", and "G1" for convenience of the description. Further, the second to fourth options 95 to 97 linked to "Shoes", "Hat", and "Accessories" of the first options 94 are not illustrated.

In this case, "Vivid", "Chic", and "Traditional" of the third option 96 are common options having common attributes regardless of the options of the high-level hierarchy (taste of the product), and third hierarchical menu 92 is a common hierarchical menu. Further, similar to the respective submenus 48 to 50 of the first embodiment, the second hierarchical menu 91 includes submenus 98, the third hierarchical menu 92 includes submenus 99, and the fourth hierarchical menu 93 includes submenus 100.

Figure 21:
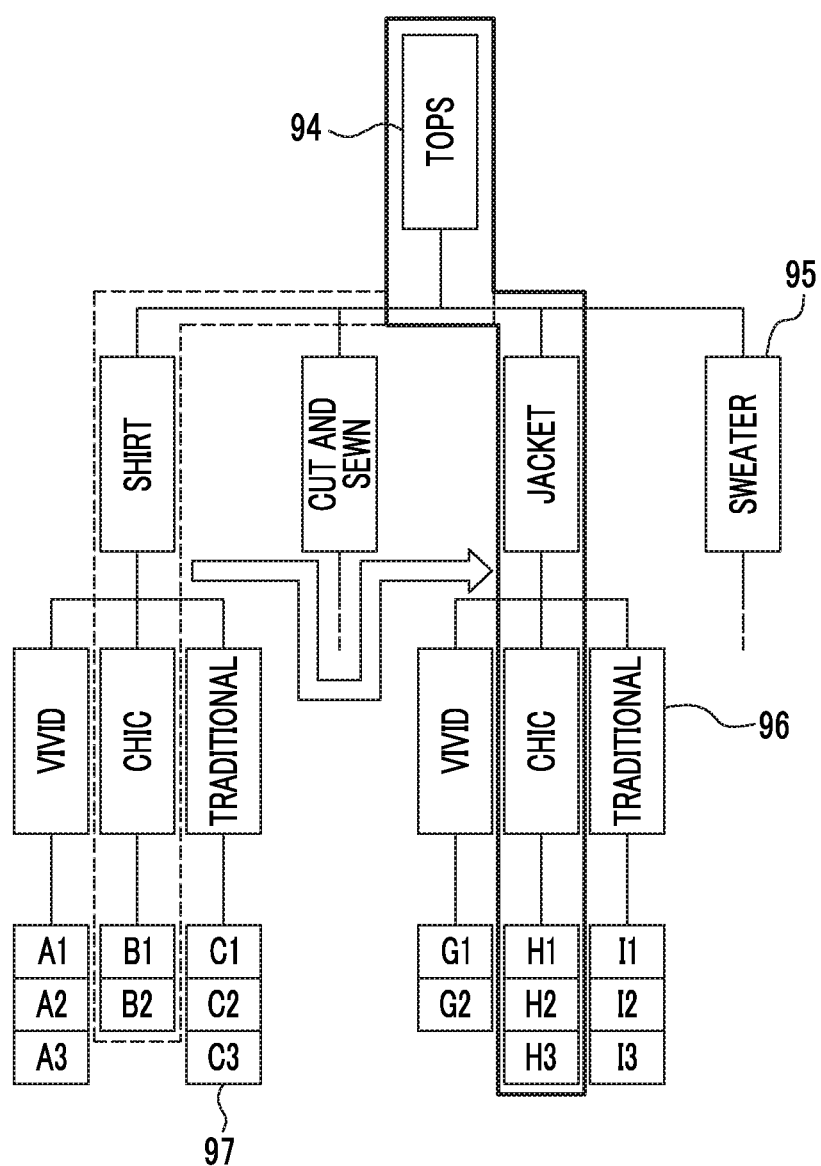
FIG. 21 is an illustrative diagram illustrating a selection route before a change and after the change in the example of FIG. 20.

In a case where the second option 95 is changed from "Shirt" to "Jacket" in a state in which, for example, the first option 94 "Tops", the second option 95 "Shirt", the third option 96 "Chic" are selected and the selection buttons 70 for respectively selecting the fourth options 97 of "B1" and "B2" of the submenus 100 of the fourth hierarchical menu 93 are displayed in the main display region 74 as surrounded by a dotted line in FIG. 21, "Chic" is automatically selected in the third option 96 by the automatic selection unit 61. As surrounded by a solid line in FIG. 21, selection buttons 70 for respectively selecting the fourth options 97 of "H1", "H2", and "H3" of the submenus 100 linked to the first option 94 "Tops", the second option 95 "Jacket", and the third option 96 "Chic" are displayed in the main display region 74.

Further, in a case where the first option 94 is changed from "Tops" to "Bottoms" in a state in which, for example, the first option 94 "Tops", the second option 95 "Shirt", the third option 96 "Chic" are selected and the selection buttons 70 for respectively selecting the fourth options 97 of "B1" and "B2" of the submenus 100 of the fourth hierarchical menu 93 are displayed in the main display region 74 as described above as surrounded by a dotted line in FIG. 22, "Pants" is automatically selected in the second option 95 and "Chic" is automatically selected in the third option 96 by the automatic selection unit 61. As surrounded by a solid line in FIG. 22, selection buttons 70 for respectively selecting the fourth options 97 of "N1" and "N2" of the submenus 100 linked to the first option 94 "Bottoms", the second option 95 "Pants", and the third option 96 "Chic" are displayed in the main display region 74.

Figure 22:
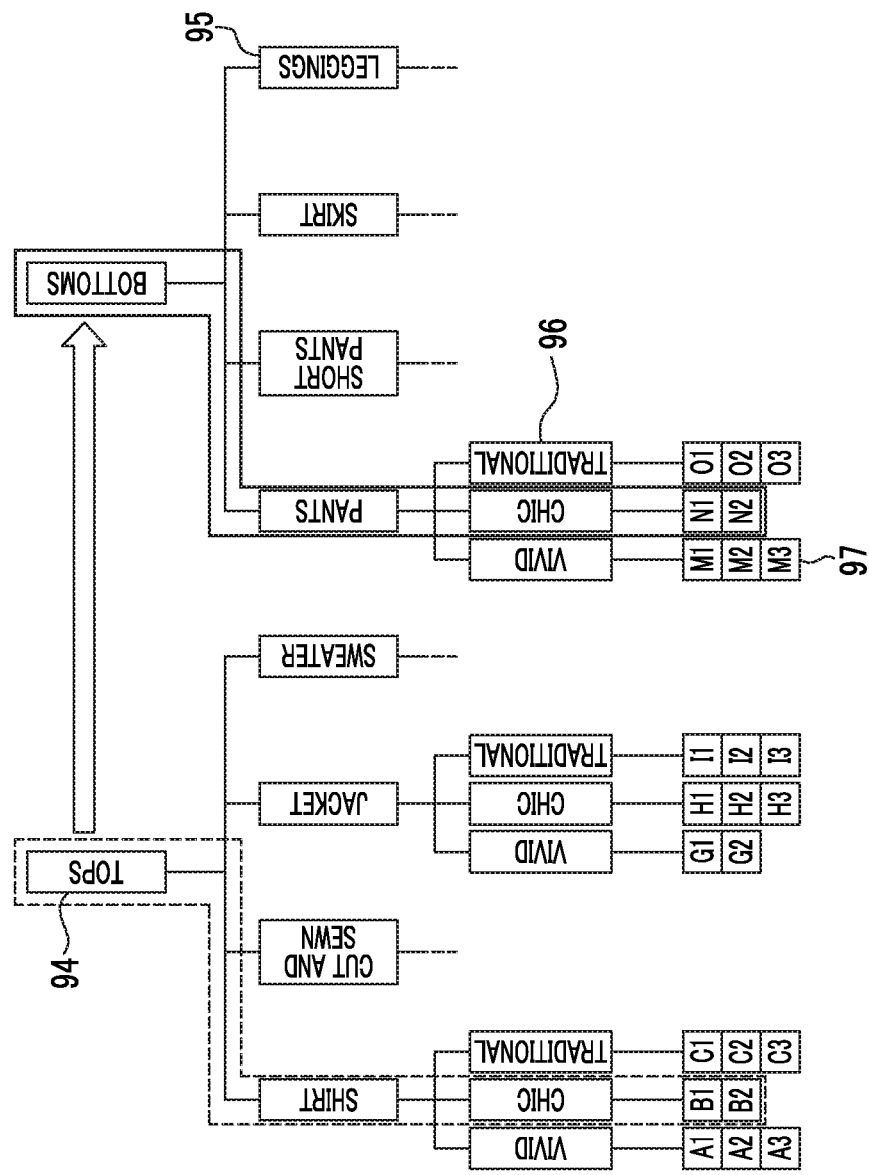
FIG. 22 is an illustrative diagram illustrating a selection route before a change and after the change in the example of FIG. 20.

In a case where there is a submenu with options that are not common options on a changed selection route, like the submenus 98 having the second options 95 in an example of FIG. 22, the automatic selection unit 61 automatically selects the option that is not a common option according to a predetermined selection condition.

In the case of the example illustrated in FIG. 22, a selection condition is that an option of which the number after the hyphen of the option ID is smallest (an option at a leftmost wing in the submenu 98 in FIG. 20) is automatically selected. Therefore, "pants" among the second options 95 of the submenu 98 linked to the "Bottoms" are automatically selected as the second option 95. Thus, the automatic selection unit 61 has a function of automatically selecting not only the common options but also options that are not common options in the changed selection route. In FIGS. 21 and 22, only options related to the description are illustrated, as in FIG. 15.

The present invention may be applied to a case where a real estate object such as a rental apartment or mansion is searched for as a product or a service on the Internet. In this case, prefectures are prepared in the first option, a railroad is prepared in the second option, lease is prepared in the third option, an exclusive area is prepared in the fourth option, a room type is prepared in the fifth option, time required to walk to a nearest station is prepared in the sixth option, years of construction are prepared in the seventh option, specific conditions such as "bath and toilet" and "southward" are prepared in the eighth option, and an object itself is prepared in the ninth option, and the third to eighth options are common options. In a case where the number of hierarchical menus is relatively large and the number of common hierarchical menus having common options is relatively large as described above, an effect of the present invention of labor saving of the option changing operation is particularly exhibited.

Figure 23:
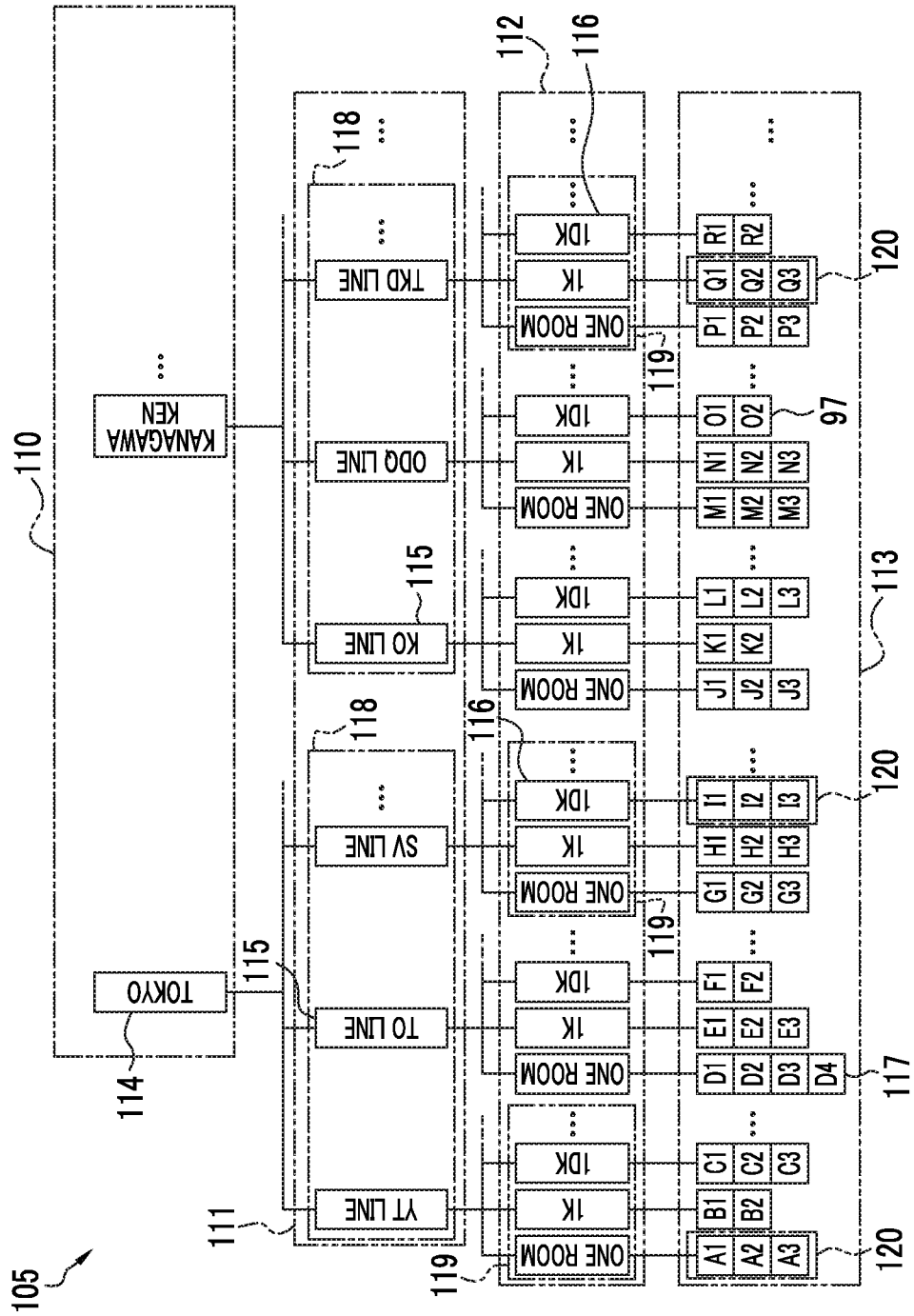
FIG. 23 is a diagram illustrating still another example of the multi-hierarchical menu.

FIG. 23 is an example of a multi-hierarchical menu 105 in a case where a real estate article such as a rental apartment or mansion is searched for on the Internet. The first option 114 indicating prefectures such as "Tokyo" and "Kanagawa Ken" is prepared in the first hierarchical menu 110, the second option 115 indicating a railroad such as "YT line" and "KO line" is prepared in the second hierarchical menu 111, the third option 116 indicating a room type such as "One room" and "1K" is prepared in the third hierarchical menu 112, and a real estate object itself is prepared as the fourth option 117 in the fourth hierarchical menu 113. Similar to the case of FIGS. 3 and 20, real estate objects of the fourth options 117 are distinguished with signs such as "A1", "B1", and "G1", for convenience of description. Further, illustration of the respective options 114 to 117 is appropriately omitted.

In this case, "One room", "1K", and the like of the third option 116 are common options, and the third hierarchical menu 112 is the common hierarchical menu. Further, similar to the respective submenus 48 to 50 of the first embodiment, the second hierarchical menu 111 has a submenu 118, the third hierarchical menu 112 has a submenu 119, and the fourth hierarchical menu 113 has a submenu 120.

Figure 24:
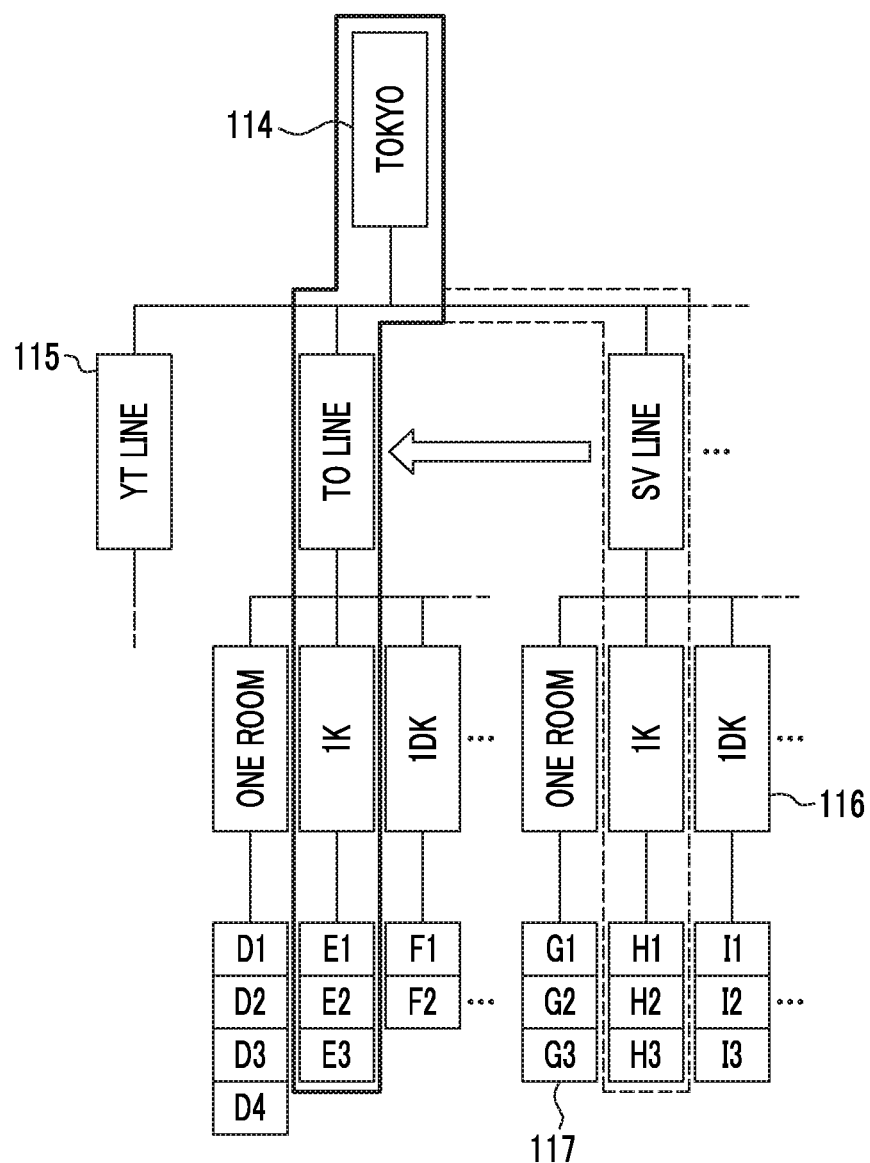
FIG. 24 is an illustrative diagram illustrating a selection route before a change and after the change in the example of FIG. 23.

In a case where the second option 115 is changed from "SV line" to "TO line" in a state in which, for example, the first option 114 "Tokyo", the second option 115 "SV line", and the third option 116 "1K" are selected, and the selection buttons 70 for selecting the fourth options 117 of "H1", "H2", and "H3" of the submenus 120 of the fourth hierarchical menu 113 are displayed in the main display region 74 as surrounded by a dotted line in FIG. 24, "1K" is automatically selected in the third option 116 by the automatic selection unit 61. As surrounded by a solid line in FIG. 24, the selection buttons 70 for selecting the fourth options 117 of "E1", "E2", and "E3" of the submenus 120 linked to the first option 114 "Tokyo", the second option 115 "TO line", and the third option 116 "1K" are displayed in the main display region 74. In FIG. 24, only options related to the description are illustrated, as in FIG. 15 or the like.

Figure 25:
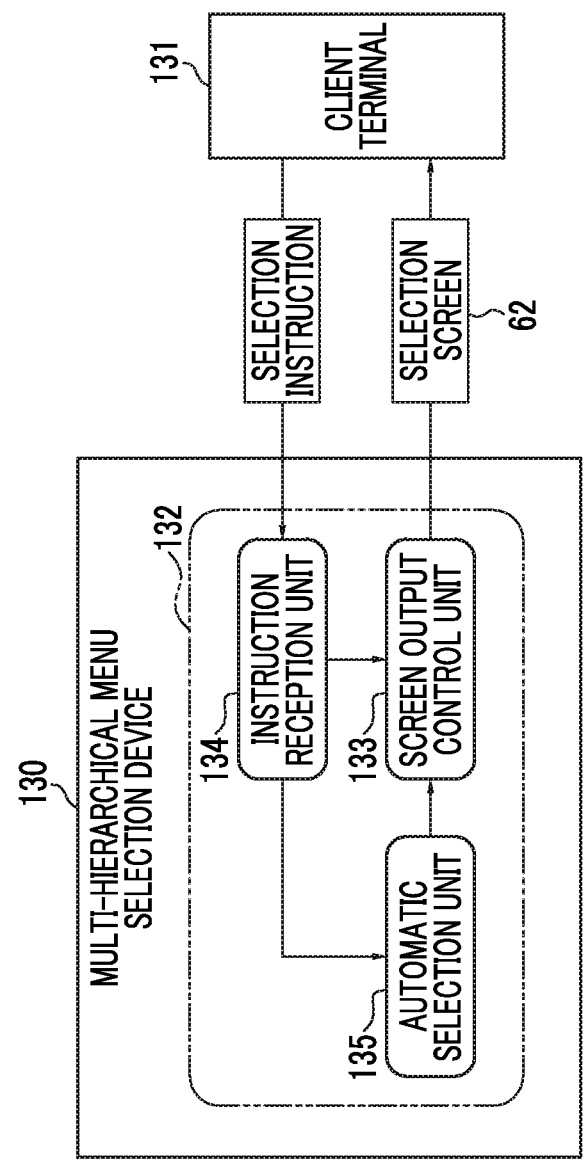
FIG. 25 is a diagram illustrating functional units of a CPU of a multi-hierarchical menu selection device in a case where the present invention is applied to a site on the Internet.

In a case where the present invention is applied to the site on the Internet, the multi-hierarchical menu selection device 130 of the present invention is connected to a client terminal 131 owned by the user over a network, as illustrated in FIG. 25. The CPU 132 of the multi-hierarchical menu selection device 130 functions as a screen output control unit 133, an instruction reception unit 134, and an automatic selection unit 135. The screen output control unit 133 and the instruction reception unit 134 have a screen output control function of controlling an output of the selection screen 62, and an instruction reception function of receiving an instruction to select each option on the selection screen 62, similar to the GUI control unit 60 of each of the above embodiments. The automatic selection unit 135 has an automatic selection function of automatically selecting an option, like the automatic selection unit 61 of each of the embodiments.

In this case, the screen output control unit 133 distributes, to the client terminal 131, the selection screen 62, for example, with a format of XML data for web distribution created by a markup language, such as an Extensible Markup Language (XML). The client terminal 131 reproduces and displays the selection screen 62 on a web browser on the basis of the XML data. The client terminal 131 transmits a selection instruction input via an input unit, such as a mouse, to the multi-hierarchical menu selection device 130. Other data description languages such as JSON (JavaScript (registered trademark) Object Notation) may be used in place of XML.

In a case where an order for a product or a service is received or the product or the service is searched for, the user finds a favorite product or service while comparing products or services. Accordingly, if the present invention is applied to such a case, it is possible to further exhibit an effect of being able to omit the option changing operation while reflecting user's preference. The multi-hierarchical menu is not limited to a multi-hierarchical menu for receiving an order for a product or a service or searching for the product or service as in the above embodiments, and may be an editing operation menu of a word processor described in JP2002-116857A or a content menu for causing content such as an image, a music file, or a template to be selected.

Although the options with exactly the same content such as "No photo", "One photo", "Two photos", and "A plurality of photos (collage)", or "Cute", "Cool", and "Simple" are examples of the common options in each of the above embodiments, options with similar content such as "Cute" and "Lovely", and "Chic" and "Monotone" may be the common options.

Further, each of the submenus of the common hierarchical menu may not have exactly the same content like the number-of-sheet submenu 48 or the taste submenu 49 of each of the above embodiments. For example, two types of taste submenus 49 including a taste submenu having options of "Cute", "Cool", and "Simple", and a taste submenu having options of "orthodox" and "luxury" in addition to "Cute", "Cool", and "Simple" may be prepared.

A display form of each hierarchical menu shown in each of the above embodiments is an example, and the present invention is not limited thereto. For example, a display form described in JP2002-116857A may be adopted. The selection button 70 of the sub display region 75 may be displayed in a tab format. Further, there may be no animation representation such as a scroll-up or a scroll-down. Further, the selection buttons 70 of the main display region 74 may have a larger size than the selection buttons 70 of the sub display region 75, instead of arranging the selection buttons 70 of the main display region 74 at wider intervals than the selection buttons 70 of the respective options of the selected menu in the sub display region 75.

The present invention is not limited to the above embodiments, and it should be understood that various configurations can be adopted without departing from the gist of the present invention. Further, it is possible to appropriately combine various embodiments or various modification examples described above. Further, the present invention also extends to a storage medium having the program stored thereon, in addition to the program.

EXPLANATION OF REFERENCES

2: print order reception device (multi-hierarchical menu selection device)
11: touch panel display
24: CPU
25: memory
26: storage device
29: operating program
30: option relationship information
35, 85, 105: multi-hierarchical menu
40: first hierarchical menu
41: second (common) hierarchical menu
42: third (common) hierarchical menu
43: fourth (last) hierarchical menu
44: first option
45: second (common) option
46: third (common) option
47: fourth (last) option
48: number-of-sheet submenu
49: taste submenu
60: GUI control unit (screen output control unit, instruction reception unit)
61: automatic selection unit
62: selection screen
63: selection route information
70: selection button
71: detailed information
72: selection mark
74: main display region
75: sub display region
79: deployment button
80: hidden menu presence mark
81: scroll bar
130: multi-hierarchical menu selection device
132: CPU
133: screen output control unit
134: instruction reception unit
135: automatic selection unit

What is claimed is:

1. A multi-hierarchical menu selection device, comprising:

a processor configured to:

control output of a selection screen in which a multi-hierarchical menu including at least three hierarchical menus including a first hierarchical menu having first options that are first selected, a last hierarchical menu having last options that are last selected, and a common hierarchical menu arranged between the first hierarchical menu and the last hierarchical menu and having a plurality of submenus including common options having a common attribute is displayed, the respective hierarchical menus appear in an order from a high-level hierarchy according to an instruction to select each option, and each option selected in each hierarchical menu is changeable until selection of the last option is determined, wherein the first hierarchical menu, common hierarchical menu and the last hierarchical menu have a tree structure including a plurality of selection routes having branch points corresponding to number of first options, common options and the last options;

receive the instruction to select each option on the selection screen; and select automatically the option on the basis of option relationship information indicating a relationship among the respective options, the option relationship information including common option information indicating which of the respective options is a common option, and selection route information indicating a selection route of each option according to the selection instruction, wherein in a case where the processor receives an instruction to change the option present in the selection route directed to the common option that is being currently selected into another option in a hierarchical menu at a higher level than the common hierarchical menu in a state in which one common option of one submenu of the common hierarchical menu is selected, the processor searches for the common options that is reachable via the other option and that is the other submenus in the same common hierarchical menu as the common option selected immediately before the change, and automatically selects the searched common options.

2. The multi-hierarchical menu selection device according to claim 1, wherein a sub display region that shows the selection route by displaying selected menus that are the hierarchical menus of which selection of options is completed in a hierarchical order from a high level, and a main display region in which an unselected menu which is a hierarchical menu at a lower level than the selected menu and of which selection of an option is not completed is displayed are provided in the selection screen.

3. The multi-hierarchical menu selection device according to claim 2, wherein the control output of the selection screen switches a display of the selection route of the sub display region according to the automatic selection of the common option.

4. The multi-hierarchical menu selection device according to claim 3, wherein all the options of the selected menu that is a combination of an option that is being selected and an unselected option are displayed in the sub display region, and the unselected option is displayed to be changeable from the option that is being selected.

5. The multi-hierarchical menu selection device according to claim 3, wherein the number of selected menus that is displayable in the sub display region is set in advance, and the control output of the selection screen hides the selected menus in an order from the selected menus of a hierarchy at a high level in a case where the number of selected menus exceeds the set number.

6. The multi-hierarchical menu selection device according to claim 2, wherein all the options of the selected menu that is a combination of an option that is being selected and an unselected option are displayed in the sub display region, and the unselected option is displayed to be changeable from the option that is being selected.

7. The multi-hierarchical menu selection device according to claim 6, wherein the number of selected menus that is displayable in the sub display region is set in advance, and the control output of the selection screen hides the selected menus in an order from the selected menus of a hierarchy at a high level in a case where the number of selected menus exceeds the set number.

8. The multi-hierarchical menu selection device according to claim 2, wherein a display area of the main display region is larger than that of the sub display region.

9. The multi-hierarchical menu selection device according to claim 8, wherein the respective options are arranged in the main display region at wider intervals that those for respective options of the selected menus in the sub display region.

10. The multi-hierarchical menu selection device according to claim 9, wherein the number of selected menus that is displayable in the sub display region is set in advance, and the control output of the selection screen hides the selected menus in an order from the selected menus of a hierarchy at a high level in a case where the number of selected menus exceeds the set number.

11. The multi-hierarchical menu selection device according to claim 8, wherein the control output of the selection screen causes detailed information on the option to be displayed in the main display region, and causes the detailed information not to be displayed in the sub display region.

12. The multi-hierarchical menu selection device according to claim 11, wherein the number of selected menus that is displayable in the sub display region is set in advance, and the control output of the selection screen hides the selected menus in an order from the selected menus of a hierarchy at a high level in a case where the number of selected menus exceeds the set number.

13. The multi-hierarchical menu selection device according to claim 8, wherein the multi-hierarchical menu selection device is capable of causing one selected menu in the sub display region in place of the unselected menu to be displayed in the main display region.

14. The multi-hierarchical menu selection device according to claim 8,
wherein the number of selected menus that is displayable in the sub display region is set in advance, and
the control output of the selection screen hides the selected menus in an order from the selected menus of a hierarchy at a high level in a case where the number of selected menus exceeds the set number.

15. The multi-hierarchical menu selection device according to claim 2,
wherein the number of selected menus that is displayable in the sub display region is set in advance, and
the control output of the section screen hides the selected menus in an order from the selected menus of a hierarchy at a high level in a case where the number of selected menus exceeds the set number.

16. The multi-hierarchical menu selection device according to claim 15,
wherein the hidden selected menu is re-displayable.

17. The multi-hierarchical menu selection device according to claim 1,
wherein the multi-hierarchical menu includes a product or a service prepared as the last option and is used to receive an order of the product or the service or to search for the product or the service.

18. The multi-hierarchical menu selection device according to claim 17,
wherein the option is a classification item for classifying the product or the service.

19. The device of claim 1, wherein in the automatically selecting, the option relationship information including the common option information indicates which of the respective options in a same hierarchy is a common option.

20. A method of operating a multi-hierarchical menu selection device, comprising:
a screen output control step of controlling output of a selection screen in which a multi-hierarchical menu including at least three hierarchical menus including a first hierarchical menu having first options that are first selected, a last hierarchical menu having last options that are last selected, and a common hierarchical menu arranged between the first hierarchical menu and the last hierarchical menu and having a plurality of submenus including common options having a common attribute is displayed, the respective hierarchical menus appear in an order from a high-level hierarchy according to an instruction to select each option, and each option selected in each hierarchical menu is changeable until selection of the last option is determined;
wherein the first hierarchical menu, common hierarchical menu and the last hierarchical menu have a tree structure including a plurality of selection routes having branch points corresponding to number of first options, common options and the last options;
an instruction reception step of receiving the instruction to select each option on the selection screen; and
an automatic selection step of automatically selecting the option on the basis of option relationship information indicating a relationship among the respective options, the option relationship information including common option information indicating which of the respective options is a common option, and selection route information indicating a selection route of each option according to the selection instruction,
wherein in a case where an instruction to change the option present in the selection route directed to the common option that is being currently selected into another option in a hierarchical menu at a higher level than the common hierarchical menu is received in the instruction reception step in a state in which one common option of one submenu of the common hierarchical menu is selected, the automatic selection step includes searching for the common options that is reachable via the other option and that is the other submenus in the same common hierarchical menu as the common option selected immediately before the change, and automatically selecting the searched common options.

21. The method of claim 20, wherein in the automatic selection, the option relationship information including the common option information indicates which of the respective options in a same hierarchy is a common option.

22. A non-transitory computer readable recording medium storing a program for operating a multi-hierarchical menu selection device, the program causing a computer to execute:
a screen output control function of controlling output of a selection screen in which a multi-hierarchical menu including at least three hierarchical menus including a first hierarchical menu having first options that are first selected, a last hierarchical menu having last options that are last selected, and a common hierarchical menu arranged between the first hierarchical menu and the last hierarchical menu and having a plurality of submenus including common options having a common attribute is displayed, the respective hierarchical menus appear in an order from a high-level hierarchy according to an instruction to select each option, and each option selected in each hierarchical menu is changeable until selection of the last option is determined;
wherein the first hierarchical menu, common hierarchical menu and the last hierarchical menu have a tree structure including a plurality of selection routes having branch points corresponding to number of first options, common options and the last options;
an instruction reception function of receiving the instruction to select each option on the selection screen; and
an automatic selection function of automatically selecting the option on the basis of option relationship information indicating a relationship among the respective options, the option relationship information including common option information indicating which of the respective options is a common option, and selection route information indicating a selection route of each option according to the selection instruction,
wherein in a case where an instruction to change the option present in the selection route directed to the common option that is being currently selected into another option in a hierarchical menu at a higher level than the common hierarchical menu is received in the instruction reception function in a state in which one common option of one submenu of the common hierarchical menu is selected, the automatic selection function includes searching for the common options that is reachable via the other option and that is the other submenus in the same common hierarchical menu as the common option selected immediately before the change, and automatically selecting the searched common options.

23. The non-transitory computer readable medium of claim 22, wherein in the automatic selection, the option relationship information including the common option information indicates which of the respective options in a same hierarchy is a common option.

* * * * *